United States Patent
Saito

(10) Patent No.: US 7,173,717 B2
(45) Date of Patent: Feb. 6, 2007

(54) SHEET POST-PROCESSING APPARATUS AND IMAGE FORMING APPARATUS EQUIPPED WITH THE SAME

(75) Inventor: Takashi Saito, Yamanashi-ken (JP)

(73) Assignee: Nisca Corporation, Yamanashi-Ken (JP)

( * ) Notice: Subject to any disclaimer, the term of this patent is extended or adjusted under 35 U.S.C. 154(b) by 782 days.

(21) Appl. No.: 10/190,608

(22) Filed: Jul. 9, 2002

(65) Prior Publication Data

US 2003/0016401 A1      Jan. 23, 2003

(30) Foreign Application Priority Data

Jul. 11, 2001   (JP)   ............... 2001-211151

(51) Int. Cl.
*G06K 15/16* (2006.01)

(52) U.S. Cl. ............ 358/1.12; 399/397; 399/403; 399/405; 399/406; 399/407; 271/175; 271/281

(58) Field of Classification Search .............. 358/1.12; 399/397, 403, 405–407; 271/175, 281
See application file for complete search history.

(56) References Cited

U.S. PATENT DOCUMENTS 6,220,592 B1 *   4/2001   Watanabe et al.   ........... 271/241
6,382,615 B1 *   5/2002   Ishiguro et al.   .......... 270/58.12
6,473,591 B2 * 10/2002   Kominato   ................... 399/405

FOREIGN PATENT DOCUMENTS

JP   H1-169562      11/1989
JP   P2001-72311 A   3/2001

* cited by examiner

*Primary Examiner*—Mark Zimmerman
*Assistant Examiner*—Jacob P Rohwer
(74) *Attorney, Agent, or Firm*—Manabu Kanesaka

(57) ABSTRACT

In a sheet post-processing apparatus and an image forming apparatus according to the present invention, the sheet post-processing apparatus is provided with discharge rollers for discharging a sheet, a fixed stacking portion for supporting a portion of the discharged sheet, a storage tray established below the fixed stacking portion with a larger surface area, and a stapler for applying a finishing process to the sheet in a state of straddling the fixed stacking portion and the storage tray. A pushing member moves the sheet finished by the stapler in a direction different from a discharge direction by the discharge rollers to discharge the sheet to the storage tray, thereby providing the sheet post-processing apparatus that can securely discharge the stapled sheet bundle to a storage tray after a post-processing such as stapling.

14 Claims, 36 Drawing Sheets

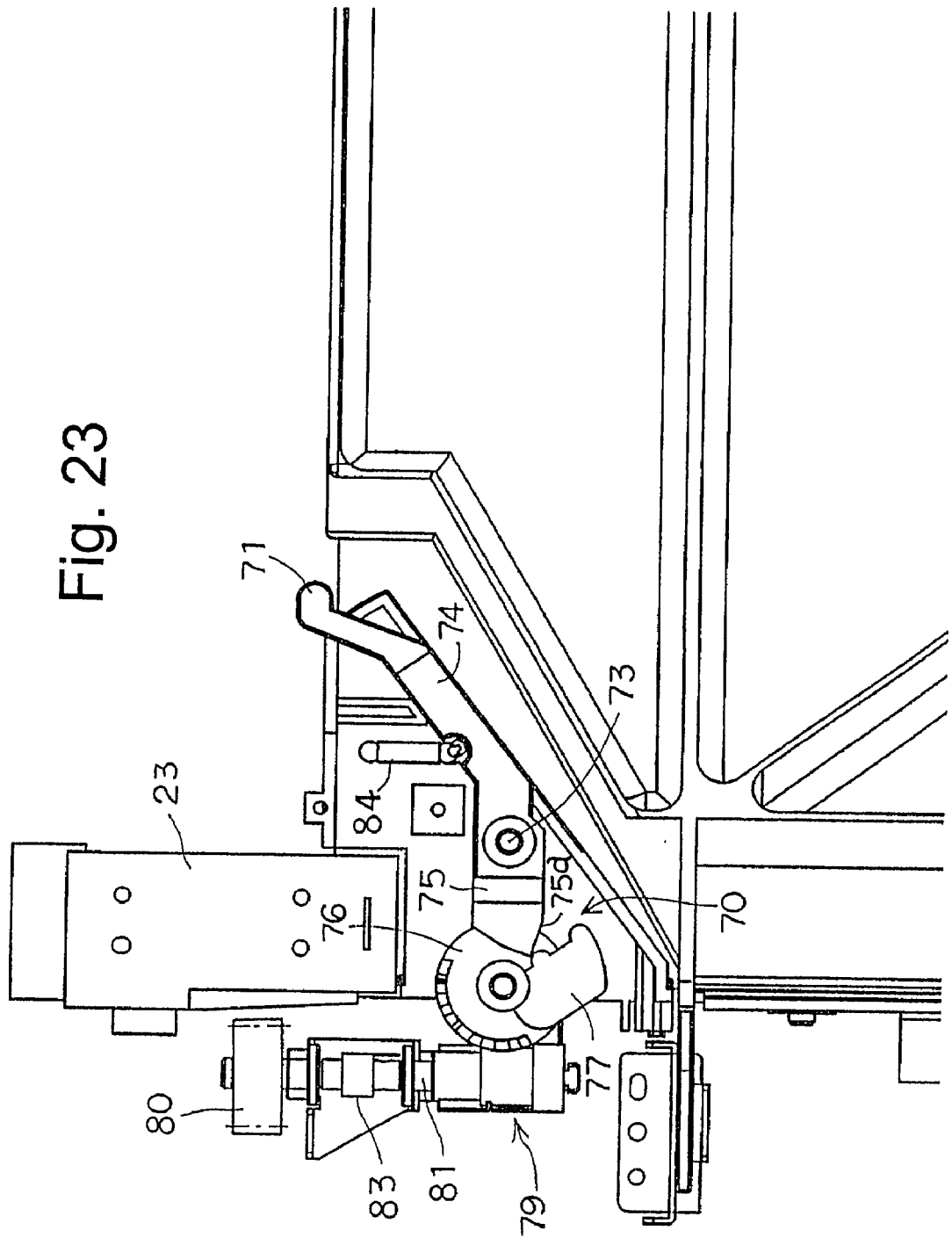

SHEET POST-PROCESSING APPARATUS AND IMAGE FORMING APPARATUS EQUIPPED WITH THE SAME

BACKGROUND OF THE INVENTION

This invention relates to a sheet post-processing apparatus for selectively applying a process such as aligning or binding to sheets sent from an image forming apparatus such as a laser printer or copier, and also relates to an image forming apparatus equipped with this sheet post-processing apparatus.

Conventionally, as shown in FIG. 33 and FIG. 34, it is known that there is a sheet post-processing apparatus 201 mounted to an image forming apparatus such as a laser printer or a copier. The sheet post-processing apparatus is equipped with an intermediate tray 222 to support an upstream side of a sheet fed from an image forming apparatus 200 and discharged by tray discharge rollers 214 and 215, and a stack tray 225 established at downstream of the intermediate tray 222 and below with the level 221 (FIG. 35(b)) being vertically moveable in the Z direction. The Sheet once discharged in a state of straddling both trays as shown in FIG. 35(a) is aligned by forcibly transporting them to an alignment reference using an abutting plate 217 and a position plate 223 by a discharge alignment belt 216 and a second alignment belt 302. While maintaining the sheet straddling both trays, a sheet bundle is formed by sequentially discharging the sheet as shown in FIG. 35(b). Then, after a post-processing of the sheet bundle such as stapling with the stapler 224, the sheet bundle is pressed by discharge means composed of the abutting plate 217 as shown in FIG. 35(c), and the apparatus discharges the sheet sequentially to the stacking tray 225 (Japanese Patent No. 08-9451). Note that a trailing edge of the sheet on the stack tray 225 is regulated by the level 221 relative to the intermediate tray 222 (a regulating plate 226).

However, in the conventional sheet post-processing apparatus described above, the sheet is curled in the transport direction (hereinafter referred to as the "feed direction") at a point where the sheet is fed from the image forming apparatus.

As described above, after applying the stapling to the sheet with a curl in the feed direction, the sheet is transported by discharge means such as the abutting plate 217 and the discharge rollers, thereby sequentially being discharged to the stack tray 225, as shown in FIG. 35(b) to FIG. 35(c). In this case, a discharging drive force applied by the abutting plate 217 and the discharge rollers is absorbed by the curl in the sheet feed direction. That is, even if the discharging drive force is applied to the sheet, the process only increases the curling, thereby causing a problem that the sheet is not fully discharged to the stack tray 215.

Thus, in view of resolving the problems related to the conventional technology, this invention provides an apparatus that can securely discharge a sheet bundle to a stack tray after applying a post-process such as stapling to the sheet bundle.

SUMMARY OF THE INVENTION

To attain the aforementioned objective, a sheet post-processing apparatus according to the present invention is provided with discharge means for discharging a sheet; sheet support means for supporting a portion of the sheet discharged by the aforementioned discharge means; sheet storage means established under the aforementioned sheet support means; sheet post-processing means for post-processing the sheet straddling the aforementioned sheet support means and the aforementioned sheet storage means; and moving means for moving the sheet finished by the aforementioned sheet post-processing means in a direction different to a discharge direction by the aforementioned discharge means to discharge the sheet to the aforementioned sheet storage means.

A sheet post-processing apparatus according to the present invention may be equipped with aligning means for aligning the sheets straddling the aforementioned sheet support means and the aforementioned sheet storage means prior to the post-processing using the aforementioned post-processing means.

The aforementioned moving means in the sheet post-processing apparatus according to the present invention moves the sheet finished by the aforementioned post-processing means in a direction substantially perpendicular to the discharge direction by the aforementioned discharge means to discharge the sheet to the aforementioned sheet storage means.

A sheet post-processing apparatus according to the present invention may be provided with drive means for driving the aforementioned sheet moving means between the aforementioned sheet support means and the aforementioned sheet storage means.

A sheet post-processing apparatus according to the present invention is provided with discharge means for discharging the sheet; sheet support means for supporting a portion of the sheet discharged by the aforementioned discharge means; sheet storage means established under the aforementioned sheet support means; sheet post-processing means for post-processing the sheet being curled and straddling the aforementioned sheet support means and the aforementioned sheet storage means; and moving means for acting on the curled portion of the sheet finished by the aforementioned post-processing means, and for moving the sheet in a direction different to the direction of discharge by the aforementioned discharge means to discharge the sheet to the aforementioned sheet storage means.

A sheet post-processing apparatus according to the present invention may be equipped with aligning means for aligning the sheet straddling the aforementioned sheet support means and the aforementioned sheet storage means prior to the post-processing using the aforementioned post-processing means.

The aforementioned moving means in the sheet post-processing apparatus according to the present invention engages the aforementioned curled portion of the sheet finished by the aforementioned post-processing means, and moves the sheet in a direction substantially perpendicular to the discharge direction by the aforementioned discharge means to discharge the sheet to the aforementioned sheet storage means.

An image forming apparatus according to the present invention is equipped with the aforementioned sheet post-processing apparatus.

As described above, in the sheet post-processing apparatus and image forming apparatus according to the present invention, the sheet applied the post-processing is moved by the moving means in a direction different from the discharge direction by the discharge means, for example in a traversing direction or a angled traversing direction, to discharge the sheet to the sheet storage means. Normally, the sheet has the curl in the feeding direction. However, because the sheet is moved in the direction traversing the direction of the curl, the discharging drive force is not absorbed by the sheet curl, as occurs conventionally, thereby enabling the sheet to be securely discharged to the sheet supply tray.

Furthermore, the moving means acts on the curled portion occurred on the sheet between the sheet support means and the sheet storage means, and moves the sheet in the direction differing from the discharge direction by the discharge means, for example in the traversing direction or the angled traversing direction, so that the sheet can be securely discharged to the sheet supply tray.

Furthermore, the drive means for driving the moving means is established between the sheet support means and the sheet storage means, thereby enabling a compact apparatus that effectively utilizes a space.

BRIEF DESCRIPTION OF THE DRAWINGS

FIG. 23 is a rear view seen from below showing the structure of the sheet bundle discharge means (the sheet moving means) in the sheet finishing apparatus according to the present invention;

FIGS. 24(a) and 24(b) are views showing an operation of the sheet bundle discharge means (the sheet moving means) in the sheet finishing apparatus according to the present invention, wherein FIG. 24(a) is a rear view showing a state during discharge and FIG. 24(b) is a rear view showing a state immediately after the discharge is completed;

FIGS. 25(a) to 25(c) are views showing the operation of the sheet bundle discharge means (the sheet moving means) in the sheet finishing apparatus according to the present invention, wherein FIG. 25(a) is a partial plan view showing a state before the discharge, FIG. 25(b) is a partial plan view showing a state during the discharge, and FIG. 25(c) is a partial plan view showing a state immediately after the discharge is completed;

DETAILED DESCRIPTION OF PREFERRED EMBODIMENTS

A. Mounting Structure and Transport System (FIG. 1)

Figure 1:
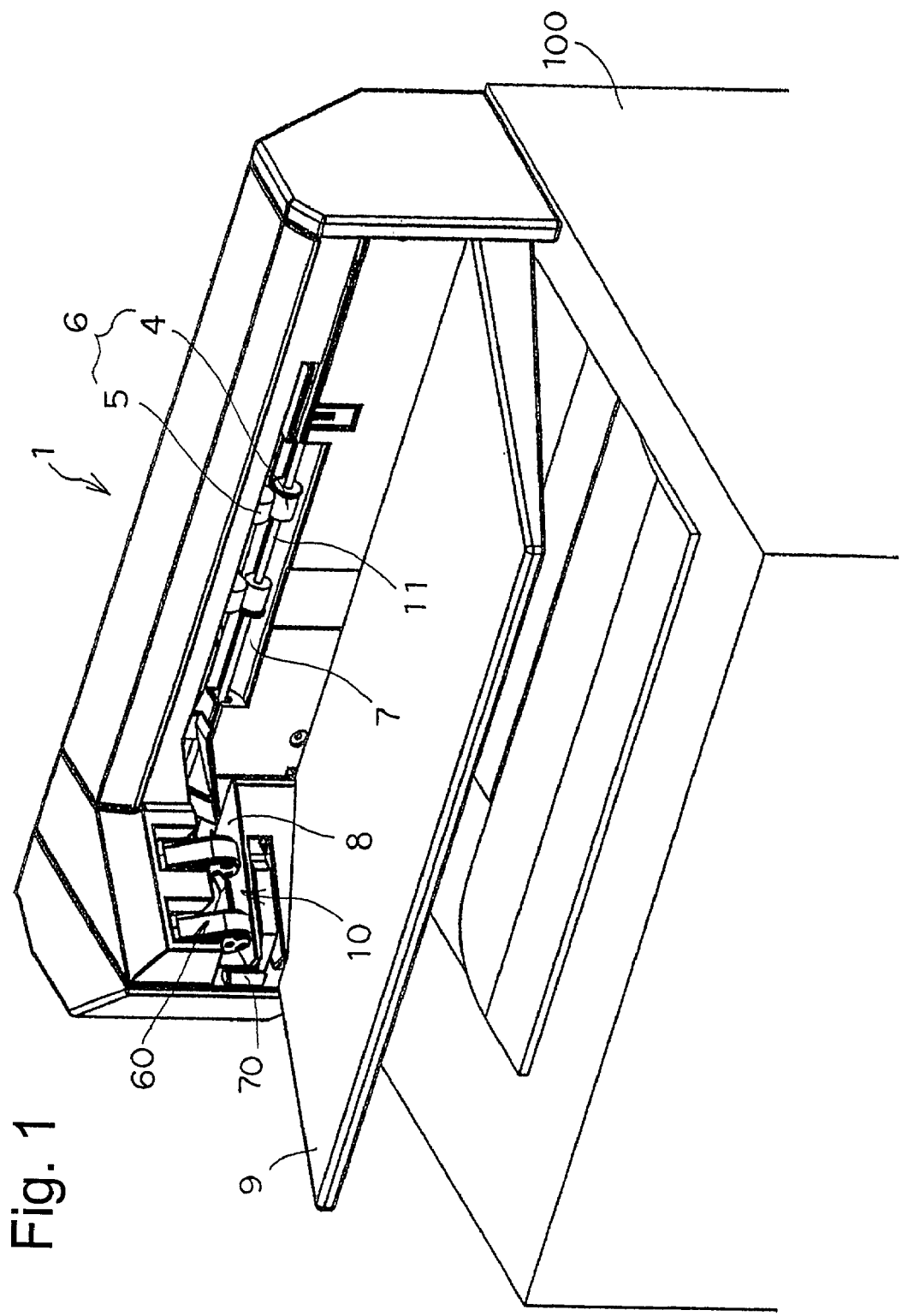
FIG. 1 is an external view showing a sheet post-processing (finishing) apparatus according to the present invention.

FIG. 1 is a view showing an embodiment of an image forming apparatus provided with a sheet finishing apparatus according to the present invention. In this embodiment, it is structured that a sheet finishing apparatus 1 according to the present invention is detachably assembled to a top of an image forming apparatus 100 composed of a page printer. More specifically, to connect the sheet finishing apparatus 1 and the image forming apparatus 100, a lock arm 1a (FIG. 2) is established and protruding on a lower side of the sheet finishing apparatus 1. The lock arm engages a holding portion (not shown in the drawings) inside of the image forming apparatus 100 to thereby mount the sheet finishing apparatus 1 on the top of the image forming apparatus 100.

Note that in this embodiment, the image forming apparatus 100 is composed of a page printer. However, it is also possible to apply the sheet finishing apparatus according to the present invention to a copier as well.

Figure 2:
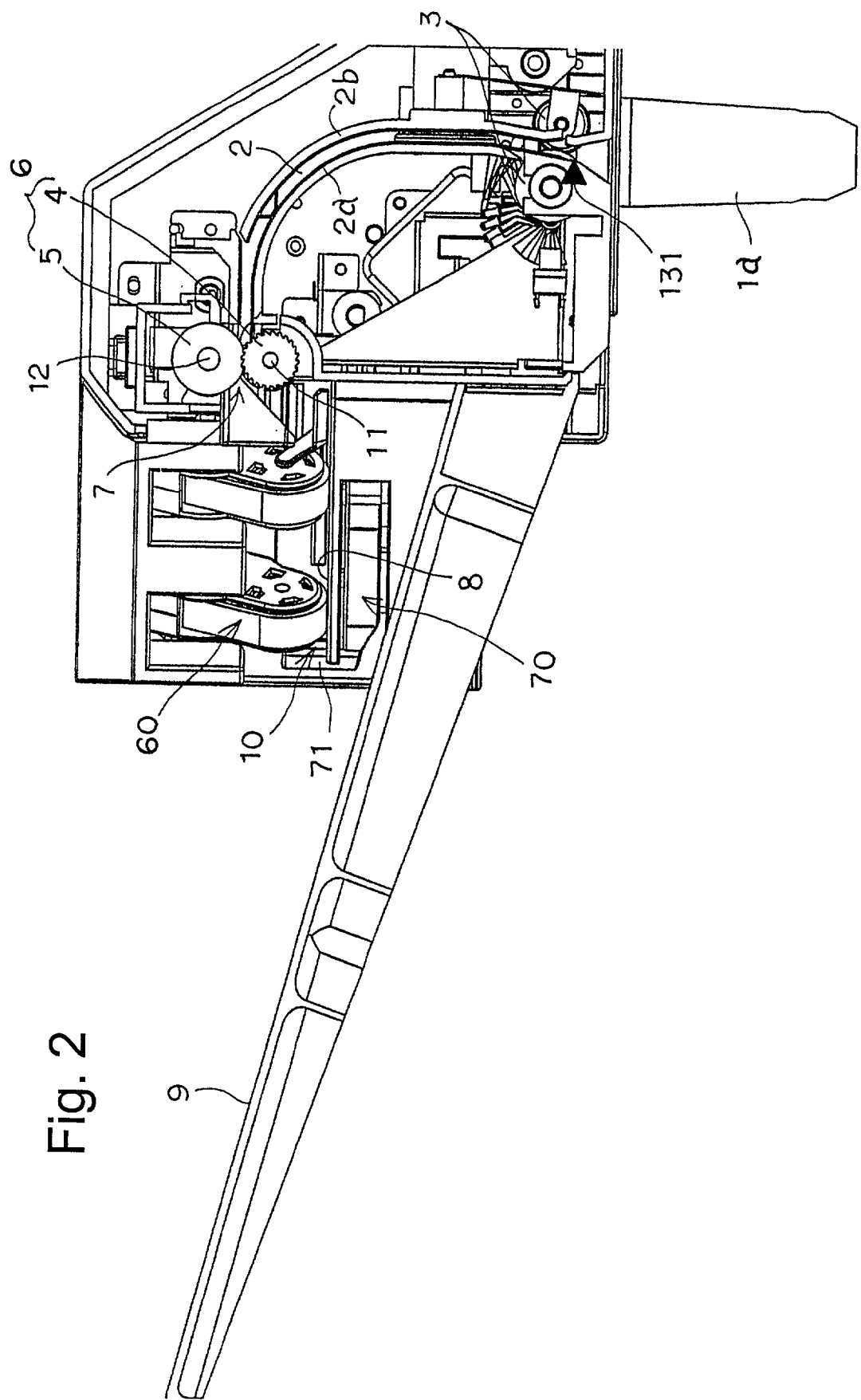
FIG. 2 is a sectional view showing the sheet finishing apparatus divided vertically at a paper path portion according to the present invention.

FIG. 2 shows a configuration of a transport system for receiving and discharging a printed or copied sheet from the image forming apparatus 100.

After the sheet is discharged upward of a discharge portion, not shown in the drawings, on the image forming apparatus 100, the sheet is sent to a paper path 2 (a sheet transport path) formed of an upper guide 2a and a lower guide 2b inside the sheet finishing apparatus 1. The paper path 2 extends substantially vertically at a back of the sheet finishing apparatus 1, then bends toward front. A pair of transport rollers 3 is disposed at a lower inlet of the paper path. In other words, the aforementioned copied sheet is fed into the paper path 2 by the pair of the transport rollers 3 disposed at the lower inlet of the paper path 2, and is fed further downstream into the sheet finishing apparatus to be discharged from a discharge outlet 7.

B. Sheet Discharge Means 6

In FIG. 1, a pair of tray discharge rollers 4 and 5 composed of a discharge roller 4 that is a follower roller and a tray discharge roller 5 that is a drive roller as a sheet discharge means 6 is arranged at the discharge outlet 7 of the sheet finishing apparatus 1.

Figure 20:
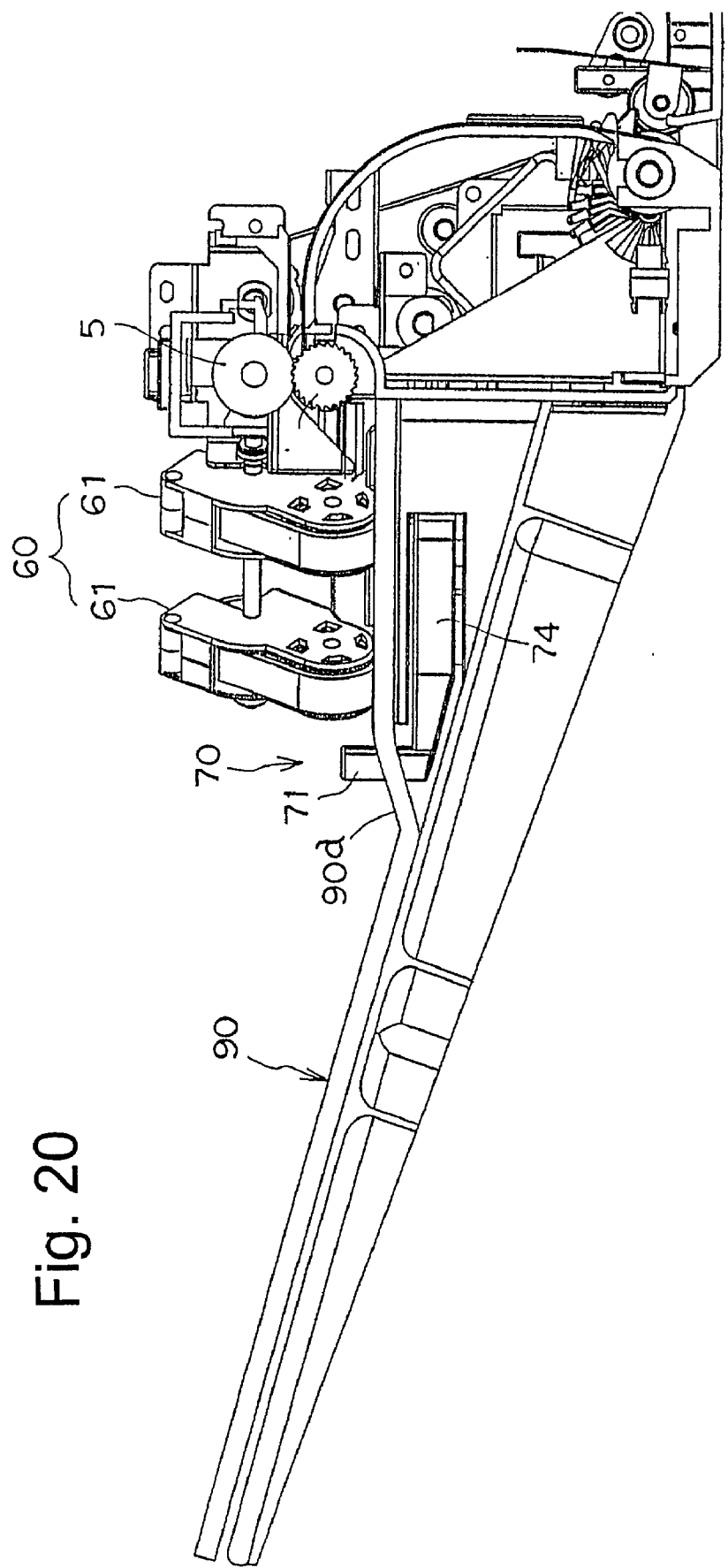
FIG. 20 is a partial sectional view showing a positional relationship in a vertical direction between the fixed stacking portion (the first tray), the storage tray (the second tray), and a sheet bundle in the sheet finishing apparatus according to the present invention.
Figure 21:
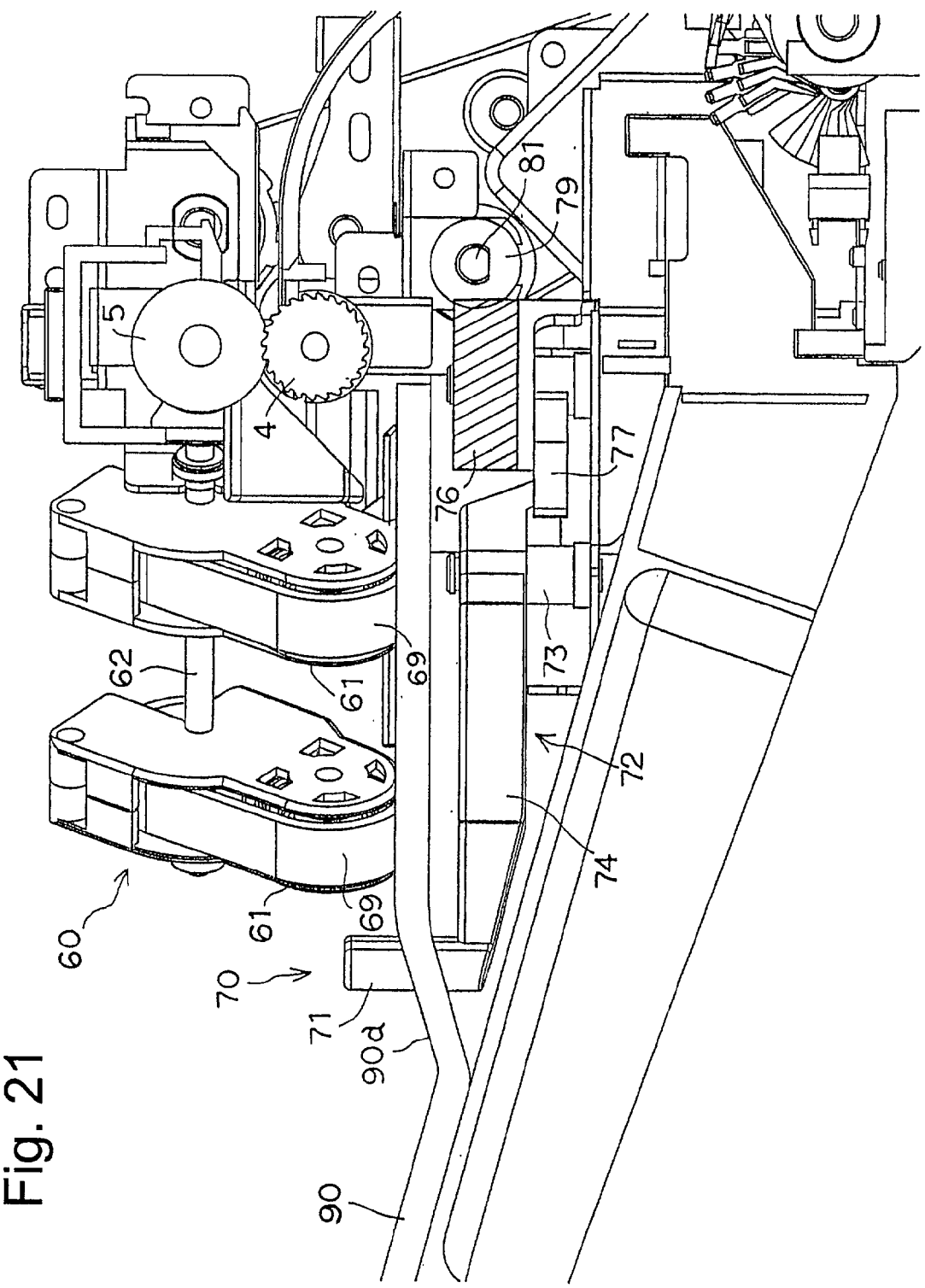
FIG. 21 is a partial sectional side view showing sheet bundle discharge means (sheet moving means) in the sheet finishing apparatus according to the present invention.

Also, at downstream of the pair of the tray discharge rollers 4 and 5 in a sheet transport direction is disposed a fixed stacking portion 8 (the first tray) as a constituent of support means 10 (sheet single corner portion support means) that supports one corner of the sheet at an upstream side in a discharge direction discharged by the aforementioned discharge means 6. In this embodiment, it is configured that the fixed stacking portion 8 supports one corner at a trailing edge side of the sheet. Furthermore, a storage tray 9 (the second tray) having a size large enough to receive the maximum sized sheet discharged as sheet storage means is disposed below the fixed stacking portion 8. Then, it is configured that the sheet is discharged from the discharge outlet 7 to the fixed stacking portion 8 and a top of a stacking surface of the storage tray 9 by the pair of the tray discharge rollers 4 and 5, and is stacked as shown in FIG. 20 and FIG. 21.

Figure 3:
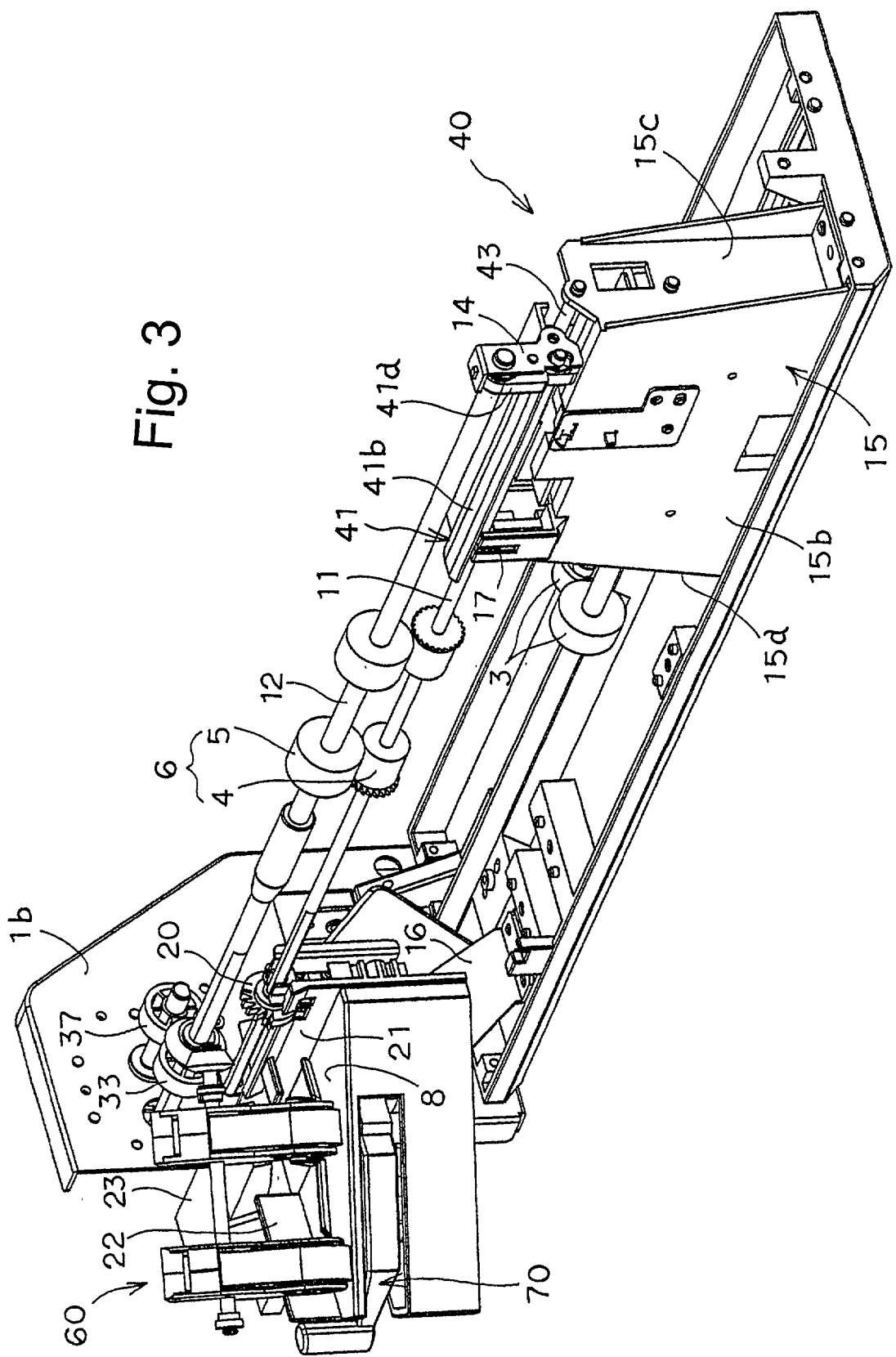
FIG. 3 is a perspective view showing the sheet finishing apparatus with a cover and a storage tray removed according to the present invention.
Figure 4:
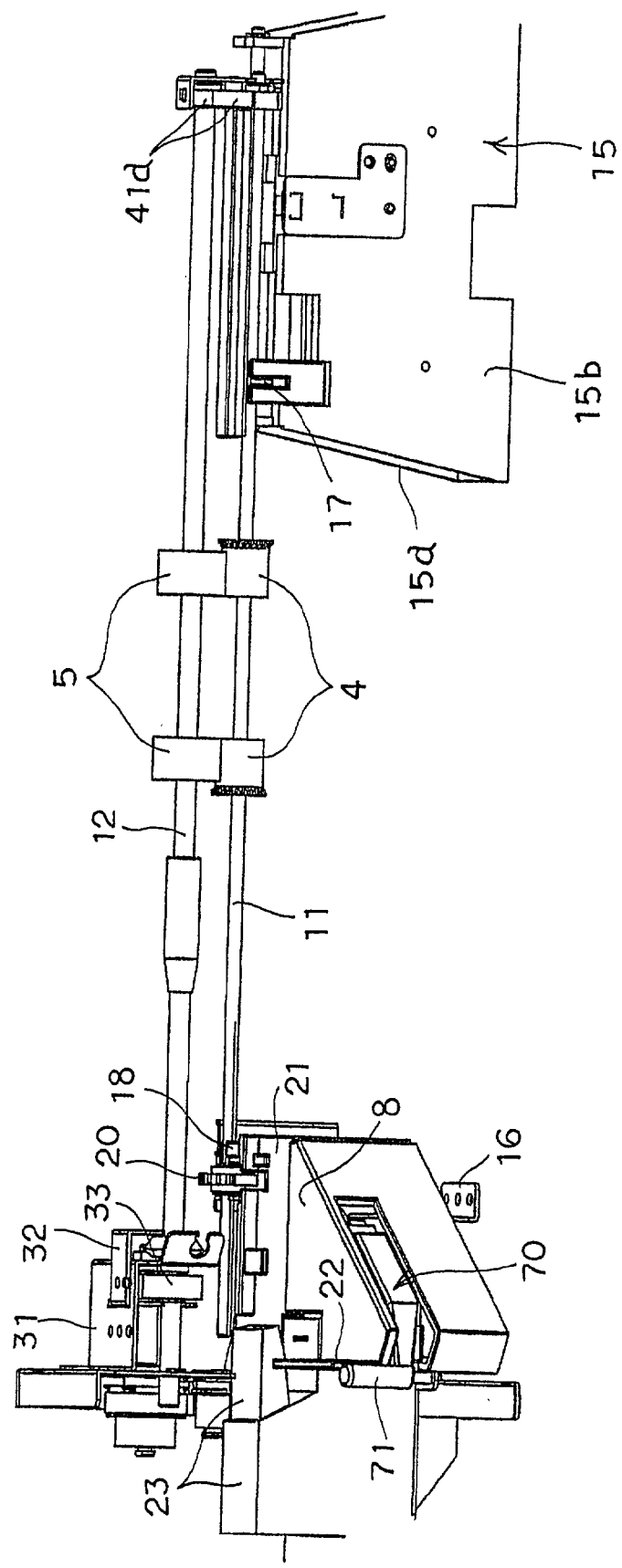
FIG. 4 is a perspective view seen from above showing the sheet finishing apparatus shown in FIG. 3 with a base frame removed.

To configure the pair of the tray discharge rollers 4 and 5 on the sheet discharge means 6 to freely rotate, as shown in FIG. 3 and FIG. 4, two supporting shafts 11 and 12 that extend in parallel vertically are rotatably arranged near the discharge outlet 7 inside of the sheet finishing apparatus 1. The aforementioned pair of the tray discharge rollers 4 and 5 is in an appropriate plurality (in this case, two pairs) mounted at a middle portion of each of the supporting shaft 11 and the supporting shaft 12.

Figure 5:
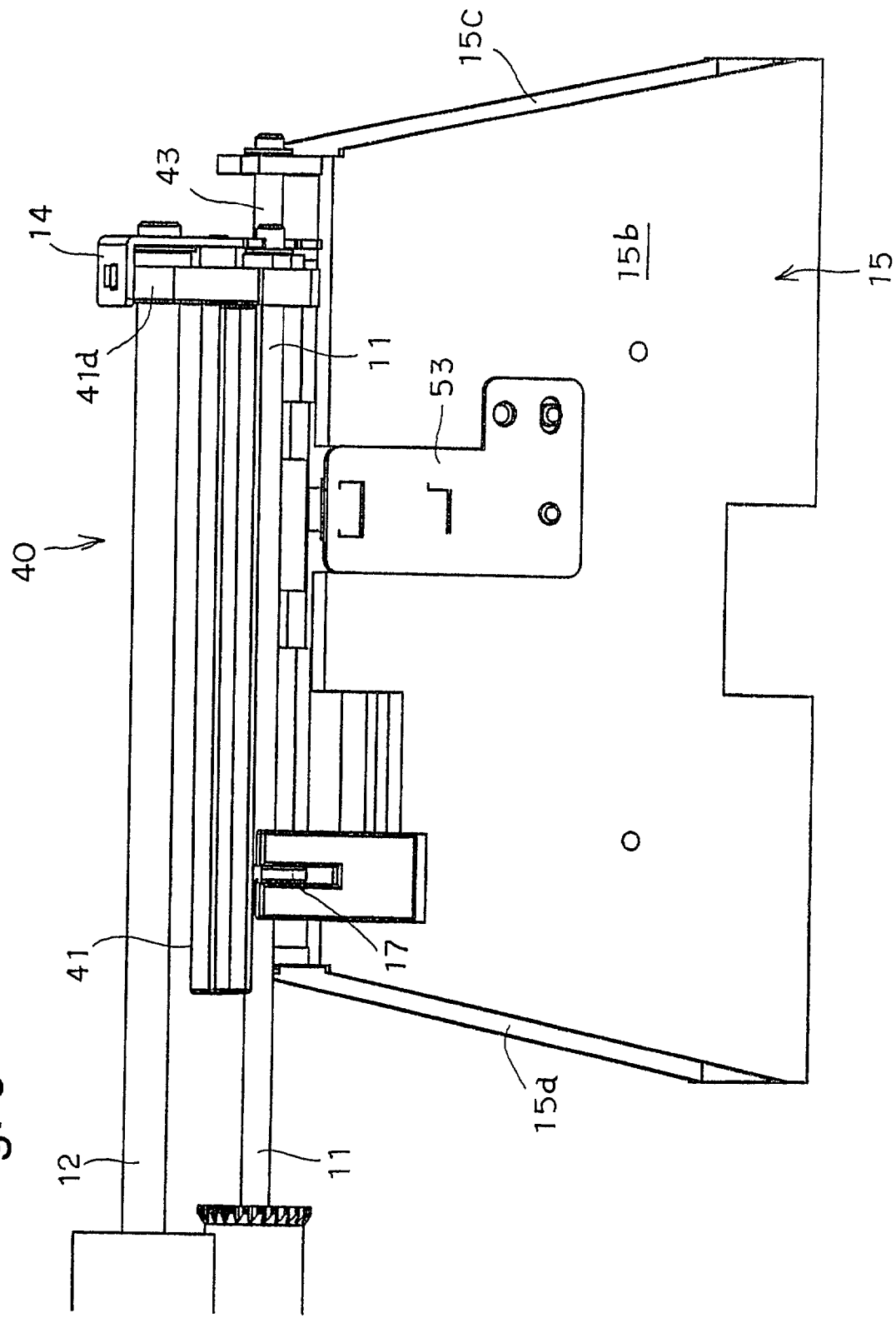
FIG. 5 is an expanded view showing a stand frame for supporting a right edge of a supporting shaft of the sheet finishing apparatus shown in FIG. 4.
Figure 6:
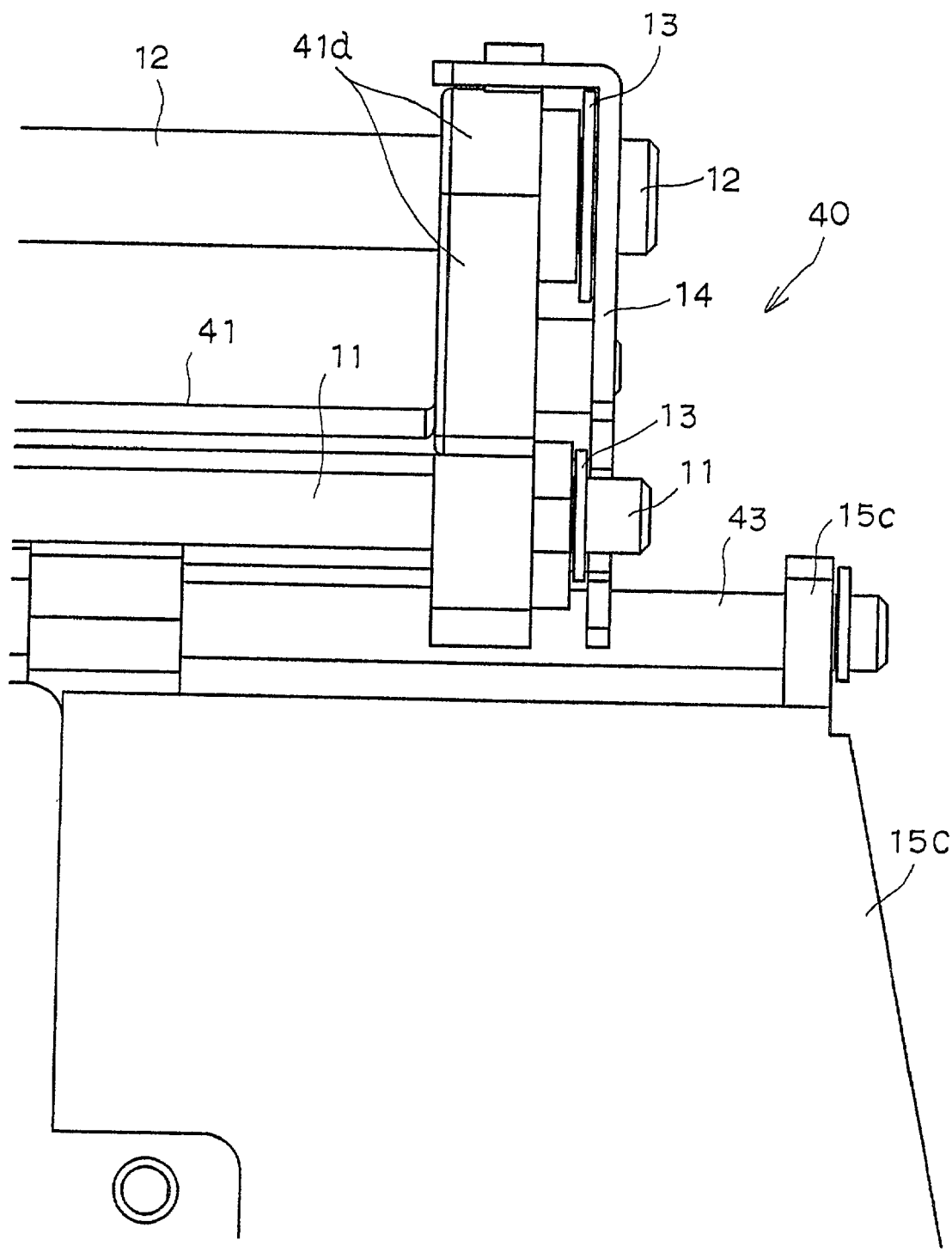
FIG. 6 is an enlarged view showing a part of FIG. 5.

As shown in FIG. 5 and FIG. 6, leading ends (on the right side in the FIG. 3) of the two supporting shafts 11 and 12 are inserted into an ear portion 41a established and protruding at an outer edge of an upper surface of a sliding joint plate 41, which is a constituent of sheet preparatory (pre-) alignment moving means 40 (side alignment means) used also as sheet shift means of sorting means (jog means), thereby being supported to rotate freely and integrated to move along with the sliding joint plate 41.

That is, an E ring 13 is disposed at a leading edge of each of the supporting shafts of 11 and 12 after passing through the ear portion 41a of the sliding joint plate 41. A moving removal preventing member 14 for commonly both supporting shafts 11 and 12 is disposed at an outer end in the shaft direction of each of the supporting shafts 11 and 12. The supporting shafts are integrated not to come out in the shaft direction through actions of the E ring 13 and the moving removal preventing member 14 disposed on an outer side thereof.

Also, among the two supporting shafts 11 and 12 unitized as described above, a leading end of the lower supporting shaft 11 is rotatably and movably supported in the shaft direction at an upper portion of a U-shaped stand frame 15 established on one side in the sheet width direction of the base frame 1c (FIG. 7) in the sheet finishing apparatus 1 by a U-shaped first bearing member 17 that is elastically movable in a vertical direction.

Figure 10:
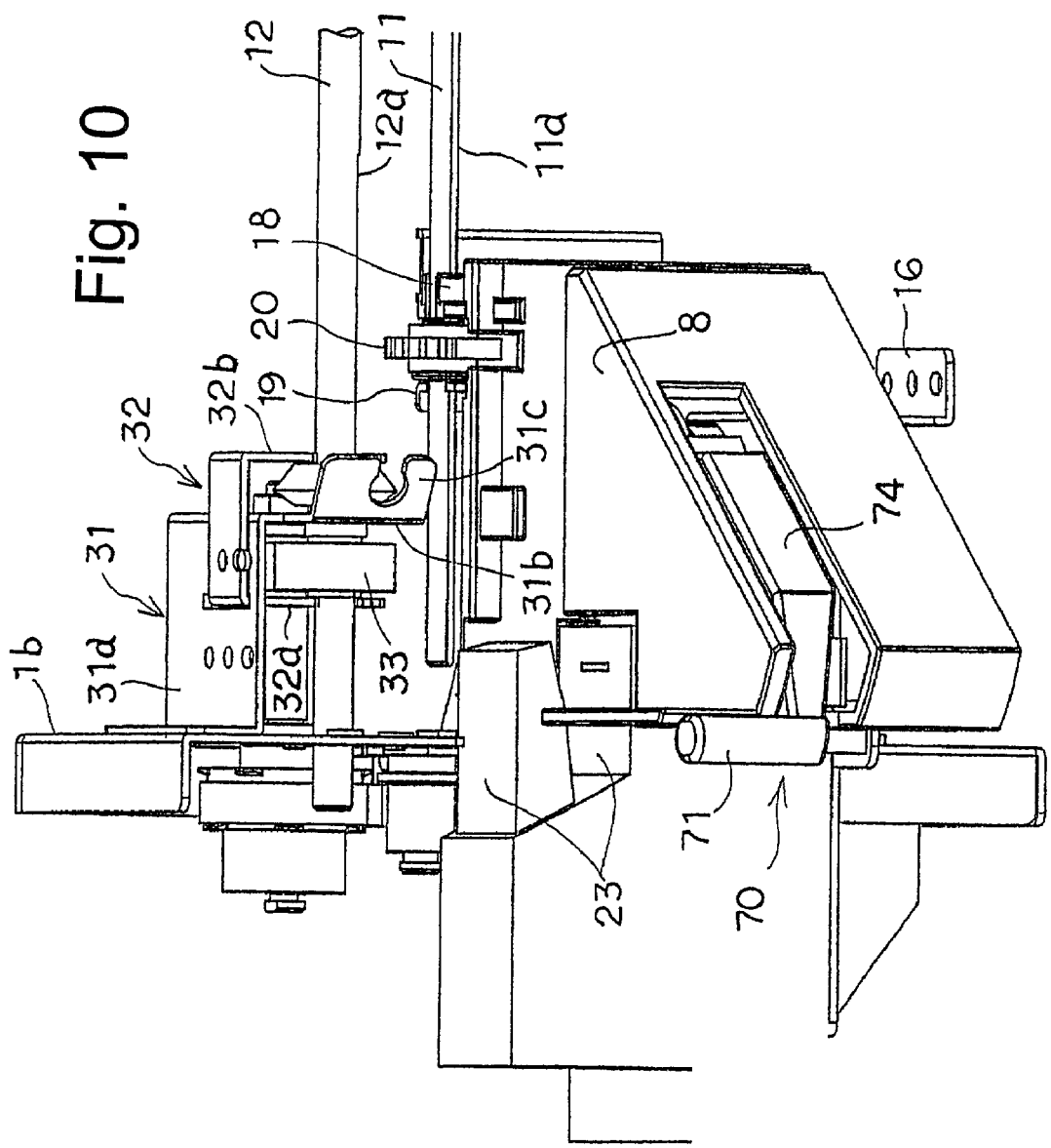
FIG. 10 is an enlarged view showing a structure supporting a left edge of the supporting shaft of the sheet finishing apparatus shown in FIG. 4.
Figure 11:
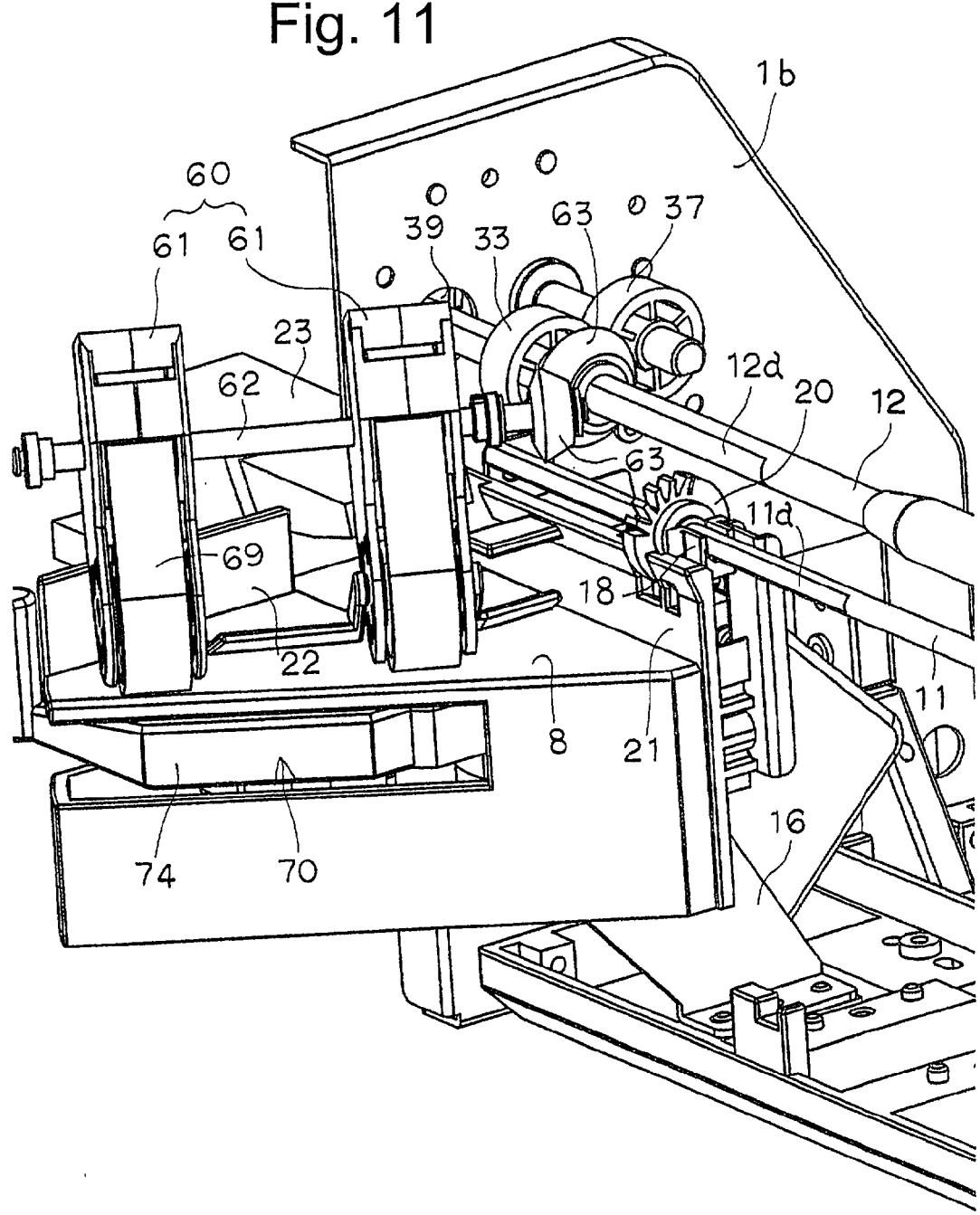
FIG. 11 is an expanded view showing a left edge side of the supporting shaft of the sheet finishing apparatus shown in FIG. 4.

On the other hand, with regard to the base side (the left side in FIG. 3) of the aforementioned two supporting shafts 11 and 12, the shafts are rotatably and slidably supported in the shaft direction. That is, in FIG. 10 and FIG. 11, the base side of the supporting shaft 11 among the two support shafts 11 and 12 is rotatably and movably supported in the shaft direction relative to the first support member 16 mounted to the side frame 1b of the sheet finishing apparatus 1 by a U-shaped second bearing member 18 that is elastically movable in a vertical direction. In this embodiment, as shown in FIG. 10 and FIG. 11, the base side of the shaft 11 is formed in an angled shape portion 11a having a D shape section. The angled shape 11a is rotatably and movably supported in the shaft direction by the U-shaped second bearing member 18 that is elastically movable in a vertical direction relative to the first support member 16.

Also, a discharge paddle 20 made of an elastic material (in this case, a rubber) comprising a plurality of teeth in a circumference direction is fitted to the squared shape 11a of the supporting shaft 11, thereby allowing the squared shape 11a to slide freely in the shaft direction. To fix an absolute position of the discharge paddle 20 in the shaft direction, the first slide regulating member 19 is mounted on the supporting shaft 11 at a position slightly away from the aforementioned second bearing member 18. The discharge paddle 20 is disposed between the aforementioned second bearing member 18 and the first slide regulating member 19, so that the supporting shaft 11 moves freely relative to the discharge paddle 20, and the discharge paddle 20 position does not change. Also, the supporting shaft 11 is configured to advance and retract freely in the shaft direction with penetrating a shaft hole of the first slide regulating member 19 and the notched opening portion 38 established in the side frame 1b, while leaving the discharge paddle 20, whose movement in the shaft direction is regulated by the first slide regulating member 19, between the first slide regulating member 19 and the second bearing member 18. Note that the aforementioned squared shape 11a with the D shaped section formed on the base side of the supporting shaft 11 slidably penetrates not only the discharge paddle 20 but also the first slide regulating member 19 in the shaft direction.

In other words, the supporting shaft 11 is formed in a D shape at least by a distance for the support shaft to advance and retract from both sides of the discharge paddle 20, and the shaft hole in the discharge paddle 20 also is formed in a D shape. By configuring the advancing and retracting portion passing through the shaft hole of the discharge paddle 20 of the supporting shaft 11 to be formed in a non-circular shape including an oval, a rotation of the supporting shaft 11 can be transmitted to the discharge paddle 20 positioned between the second bearing member 18 and the first slide regulating member 19 even when the supporting shaft 12 and the supporting shaft 11 are advanced or retracted (sliding in the shaft direction). Therefore, while the pair of the tray discharge rollers 4 and 5 is advancing and retracting in the shaft direction along with the supporting shafts 11 and 12 to discharge the sheet, the discharge paddle 20 stays at a predetermined position between the first slide regulating member 19, in other words, rotating without moving in the shaft direction, for the discharge paddle 20 to apply a discharge action to the sheet.

Furthermore, the base side of the upper supporting shaft 12 also is supported to be able to move in the shaft direction relative to the second supporting member 31 mounted on the side frame 1b. In other words, as shown in FIG. 10, an upper surface wall 31a that extends slightly inside from the side frame 1b and the second supporting member 31 having a vertical downward bent wall 31b that continues downward from the upper surface wall are disposed on an inner wall of the side frame 1b. Further, the second slide regulating member 32 having a reversed U-shaped that comprises the leg portion 32a and the leg portion 32b is disposed with the leg portion 32a penetrating vertically downward the upper surface wall 31a of the aforementioned second supporting member 31. Also, between the leg portion 32a of the second slide regulating member 32 and the vertical downward wall 31b of the second supporting member 31, the interlock gear 33 is disposed on the supporting shaft 12. The aforementioned interlock gear 33 allows a relative sliding in the shaft direction with regard to the supporting shaft 12 penetrating therethrough, but does not allow a relative rotation.

In the case of this embodiment, as shown in FIG. 10 and FIG. 11, the base side of the supporting shaft 12 is formed as a squared shape 12a having a D shape section. A cooperative action of the squared shape 12a and a bearing portion of the second supporting member 31 allows the base side of the supporting shaft 12 to rotate via the interlock gear 33 and move in the shaft direction.

Through the slide support structure described above, the supporting shafts 11 and 12 can rotate freely and move together with a movement of the slide joint plate 41 in the shaft direction with the leading ends thereof joined together by the slide joint plate 41.

Figure 12:
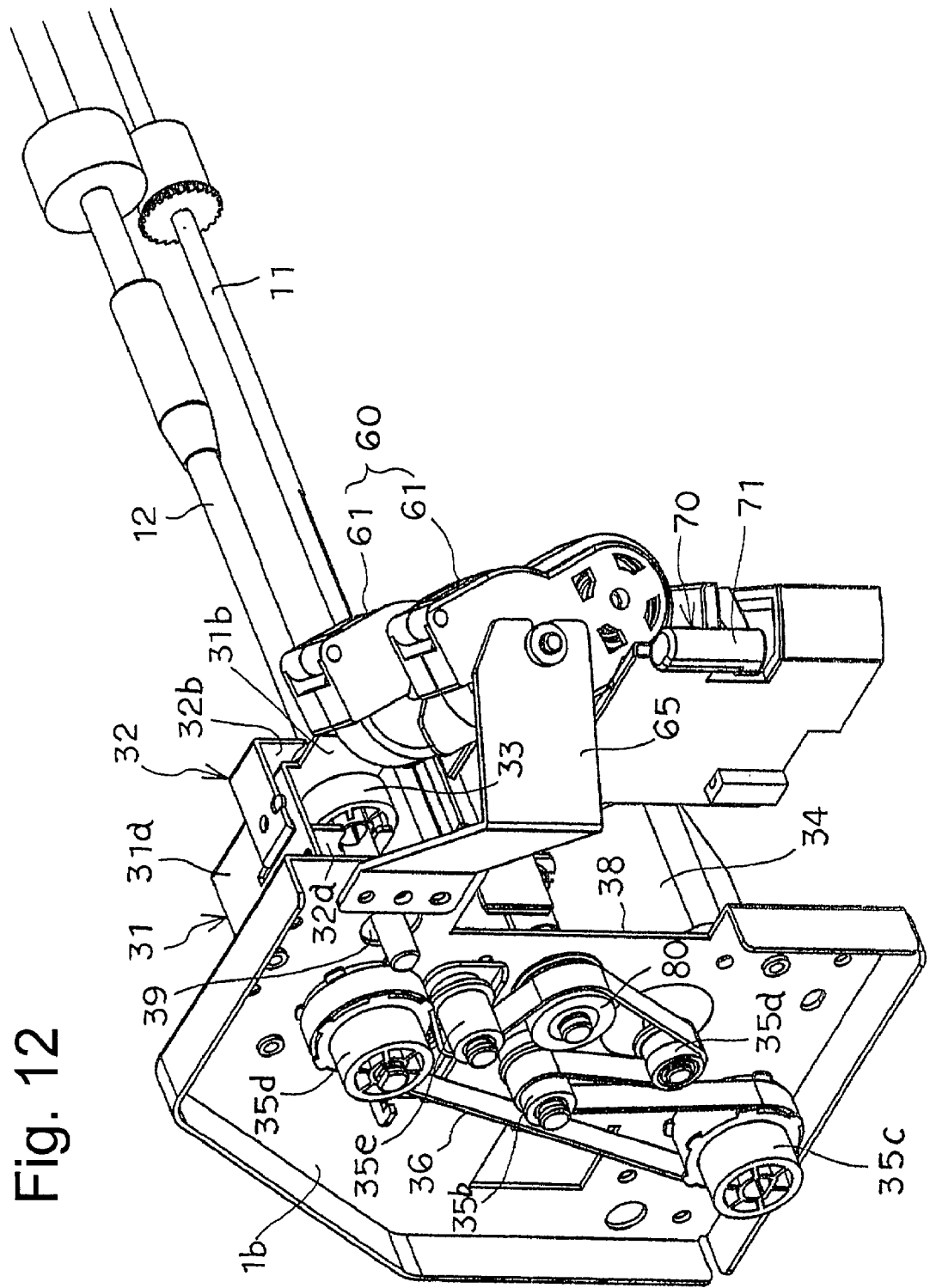
FIG. 12 is a perspective view showing a drive mechanism of the supporting shaft of the sheet finishing apparatus shown in FIG. 4.

As shown in FIG. 12, a transport motor 34 for driving the aforementioned supporting shaft 12 to rotate to apply a transport force to the sheet and a force transmission mechanism are disposed on the side frame 1b. That is, the force transmission mechanism is configured so that an output of the transport motor 34 is transmitted from a motor pulley 35a mounted on a output shaft to an intermediate pulley 35b, a transport roller pulley 35c and a follower pulley 35d via a timing belt 36, and further to the interlock pulley 37 disposed on the same shaft as that of the follower pulley 35d. An interlock gear 33 disposed on the aforementioned supporting shaft 12 engages the interlock gear 37 that is an output side of the force transmission mechanism. Thus, a drive from the transport motor 34 is received at the interlock gear 33 and rotates the supporting shaft 12, accompanying that a supporting shaft 11 at a follower side also rotates.

That is, the tray discharge roller 5 is a drive roller rotated by the transport motor 34 via the aforementioned force transmission mechanism. On the other hand, the tray discharge roller 4 is a follower roller in contact with the tray discharge roller 5 and rotates by the rotation of the tray discharge roller 5.

Figure 13:
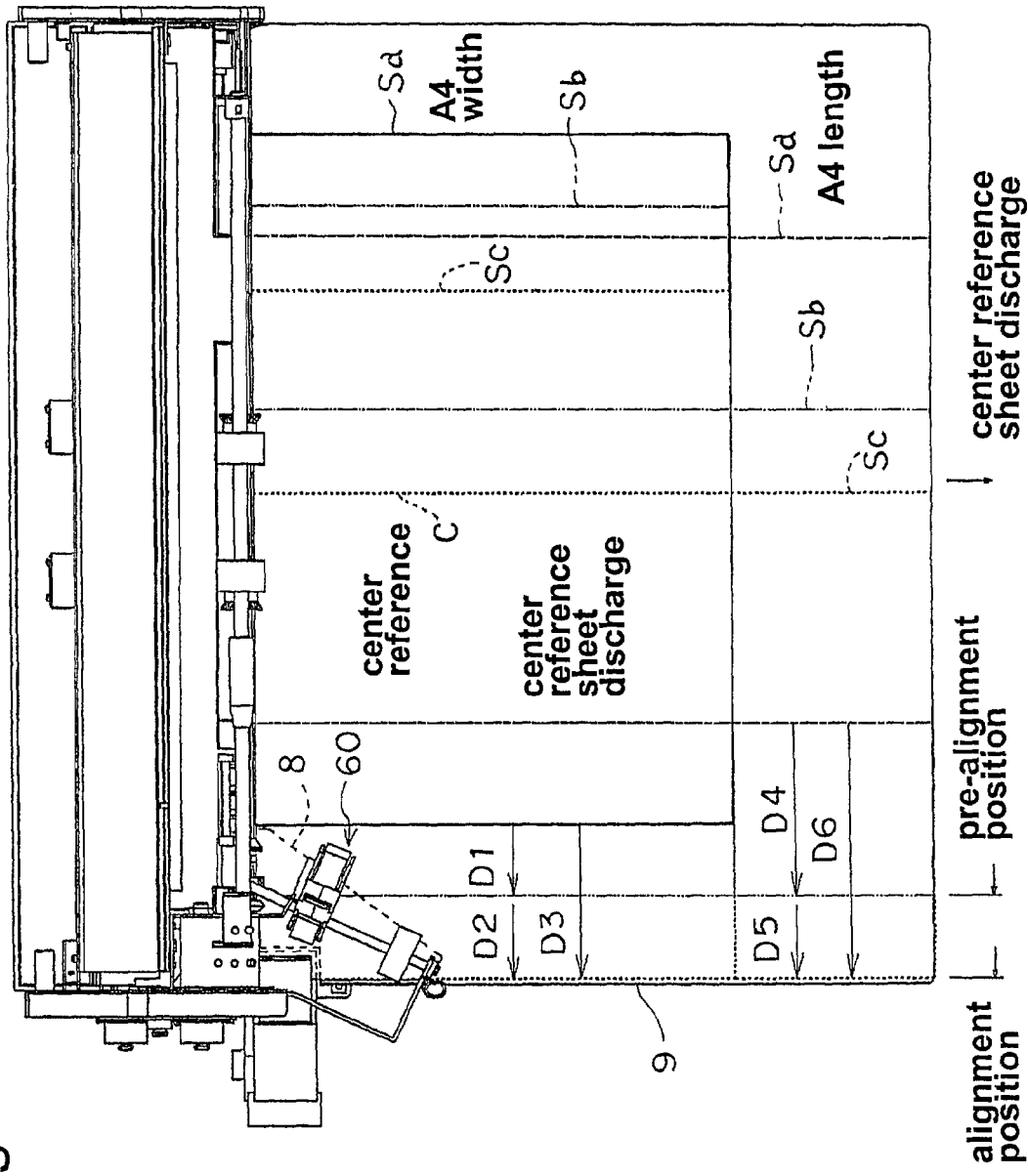
FIG. 13 is a drawing showing a relationship between a position of the sheet discharged from the sheet finishing apparatus according to the present invention with a center as a reference and a preparatory (pre-) alignment position as well as an alignment position.
Figure 14:
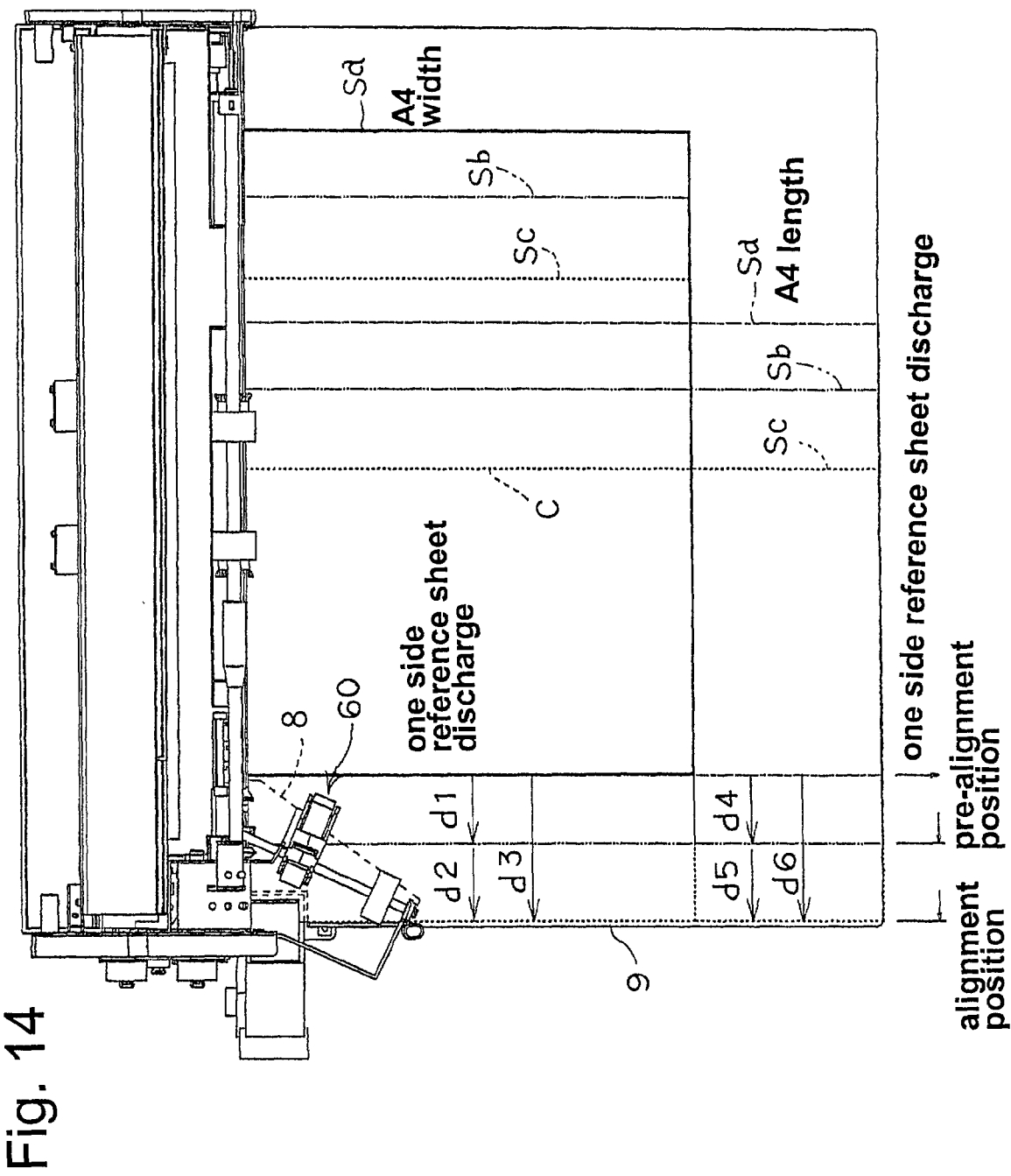
FIG. 14 is a drawing showing a relationship between a position of the sheet discharged from the sheet finishing apparatus according to the present invention with a side edge as a reference and the preparatory (pre-) alignment position as well as the alignment position.
Figure 36:
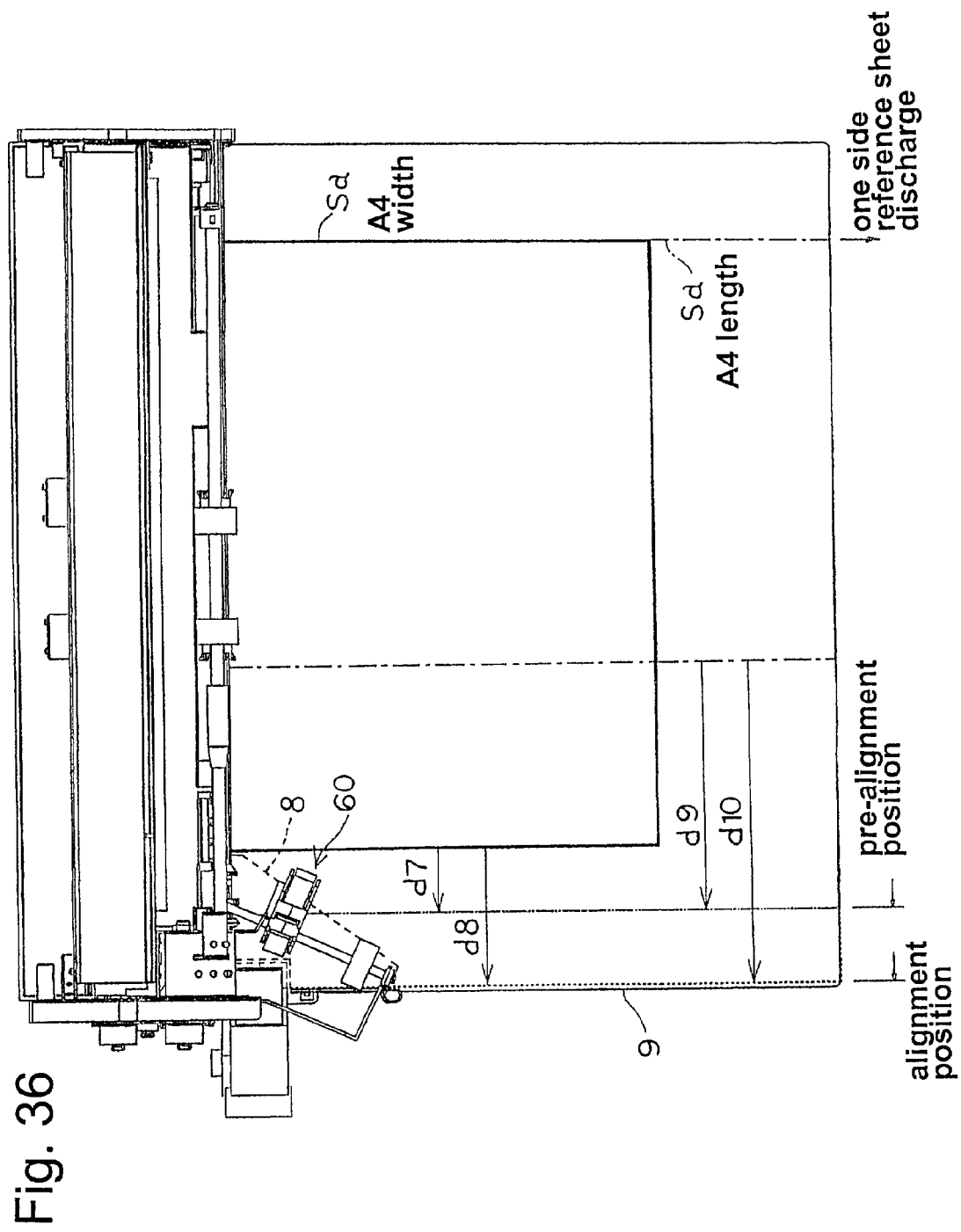
FIG. 36 is a drawing showing a relationship between a position of the sheet discharged from the sheet finishing apparatus according to the present invention with a side edge as a reference and the preparatory (pre-) alignment position as well as the alignment position.

C. Alignment Reference Position and Finishing Means (FIG. 13, FIG. 14 and FIG. 36)

In the sheet discharge means 6 of the aforementioned configuration, the sheet is nipped and applied a transport force by the pair of the rotating tray discharge rollers 4 and 5, and discharged from the discharge outlet 7 to the fixed stacking portion 8 (the first tray) and the storage tray 9 (the second tray). FIG. 13 is a view showing a state that the sheet is discharged with a center as a reference, and FIG. 14 is a view showing a state that the sheet is discharged with a rear side as a reference. FIG. 36 is a view showing a state that the sheet is discharged with a one front side as a reference.

Figure 15:
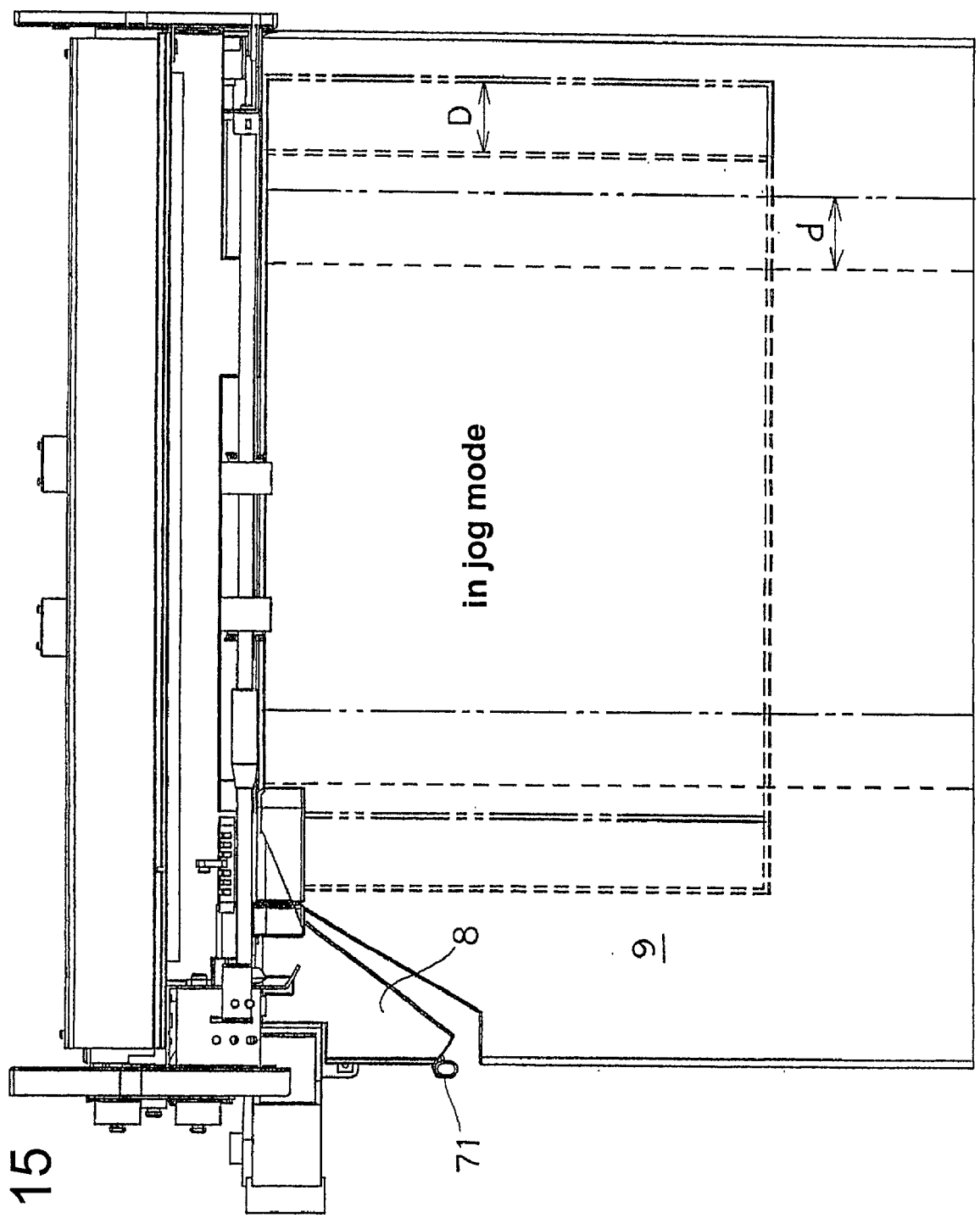
FIG. 15 is a drawing showing a sheet discharge position when the sheet finishing apparatus according to the present invention operates in a jog mode.

Also, FIG. 15 is a view showing a state that the sheet is discharged in a jog mode, which is described below. In the jog mode, while shifting each of the sheet bundles alternately by a distance D5, which is an offset amount, the sheet bundles are sequentially discharged and stacked, thereby obtaining the vertical offsetting (offset) between the stacked sheet bundles.

The storage tray 9 (the second tray) as the sheet storage means is established to support three corners, excluding a sheet corner portion supported by sheet single corner portion support means, when the stapler (finishing means) 23 applies a finishing process to the sheets, which is described later. However, it is also possible to be an embodiment having a size to support one of the upstream corners of the three corners and a part of the backside of the sheets. In this example, the storage tray 9 (the second tray) has a rectangular shape, whose size has a dimension capable of storing a vertically long size of full sized sheets such as A3 or B4 (in this case, a length of A3 size).

On the other hand, the fixed stacking portion 8 (the first tray) as the aforementioned sheet single corner portion support means is formed so that an edge of the upper surface that supports the sheet on the fixed stacking portion 8 (the first tray) is positioned closer to a side of a single corner of the sheet than a diagonal line drawn between two neighboring corners and a single corner of the sheet when discharging the smallest size of the sheet to be handled using the sheet discharge means 6. Here, the fixed stacking portion 8 (the first tray) as the aforementioned sheet single corner portion support means is arranged above a single corner portion (the upper left corner in FIG. 13) at upstream of the storage tray 9 in the sheet discharge direction to compensate a part of a sheet storage surface of the storage tray 9 seen from above.

Further, a shape of the fixed stacking portion 8 (the first tray) has a substantially triangle or a rectangular shape, however, may be formed in other shape like any polygonal shape or a circular shape.

As shown in FIG. 3 and FIG. 4, an abutting plate 21 as one of the positioning reference means (an alignment reference member) is arranged at upstream of the fixed stacking portion 8 in a fixed or semi-fixed state to align at least one side of the sheet discharged by the discharge means 6, thereby configuring a discharge direction reference surface for providing a discharge direction alignment reference position when aligning the sheets.

On one side of the fixed stacking portion 8 is arranged a positioning plate 22 composed of an abutting reference (a width direction alignment reference position) in the traverse direction to the sheet discharge direction (hereinafter referred to as the width direction) as one of the position alignment reference means (an alignment reference member) to align at least one side of the sheet discharged by the discharge means 6.

The abutting plate 21 (the discharge direction alignment reference position) and the positioning plate 22 (the width direction alignment reference position) regulate the finishing position.

A stapler 23 that pierces staples into to bind the sheet bundles aligned by being pushed against the finishing position is disposed on the aforementioned fixed stacking portion 8 (the first tray) as the finishing means.

D. Preparatory (Pre-) Alignment Movement Means (Sheet Shift Means) 40

Upon discharging the sheet with a side and a center as a reference, the sheet is horizontally moved to a side of the width direction alignment reference position by a distance of D1 to D4 in FIG. 13 and FIG. 14 by the sheet shift means of the jog means described below along with the preparatory (pre-) alignment movement means (the side alignment means) 40, and is bound by the aforementioned stapler 23. Also, in the jog mode, the sheet is horizontally fed (a traverse movement) by an amount of D5 in FIG. 15 for sorting.

For that purpose, the preparatory (pre-) alignment movement means 40 is configured to include the sliding joint plate 41 and its sliding drive portion 45 to move the supporting shafts 11 and 12 together in the shaft direction with a presumption of the aforementioned sliding structure wherein the supporting shafts 11 and 12 on the pair of the tray discharge rollers 4 and 5 can freely advance and retract in the shaft direction.

Figure 7:
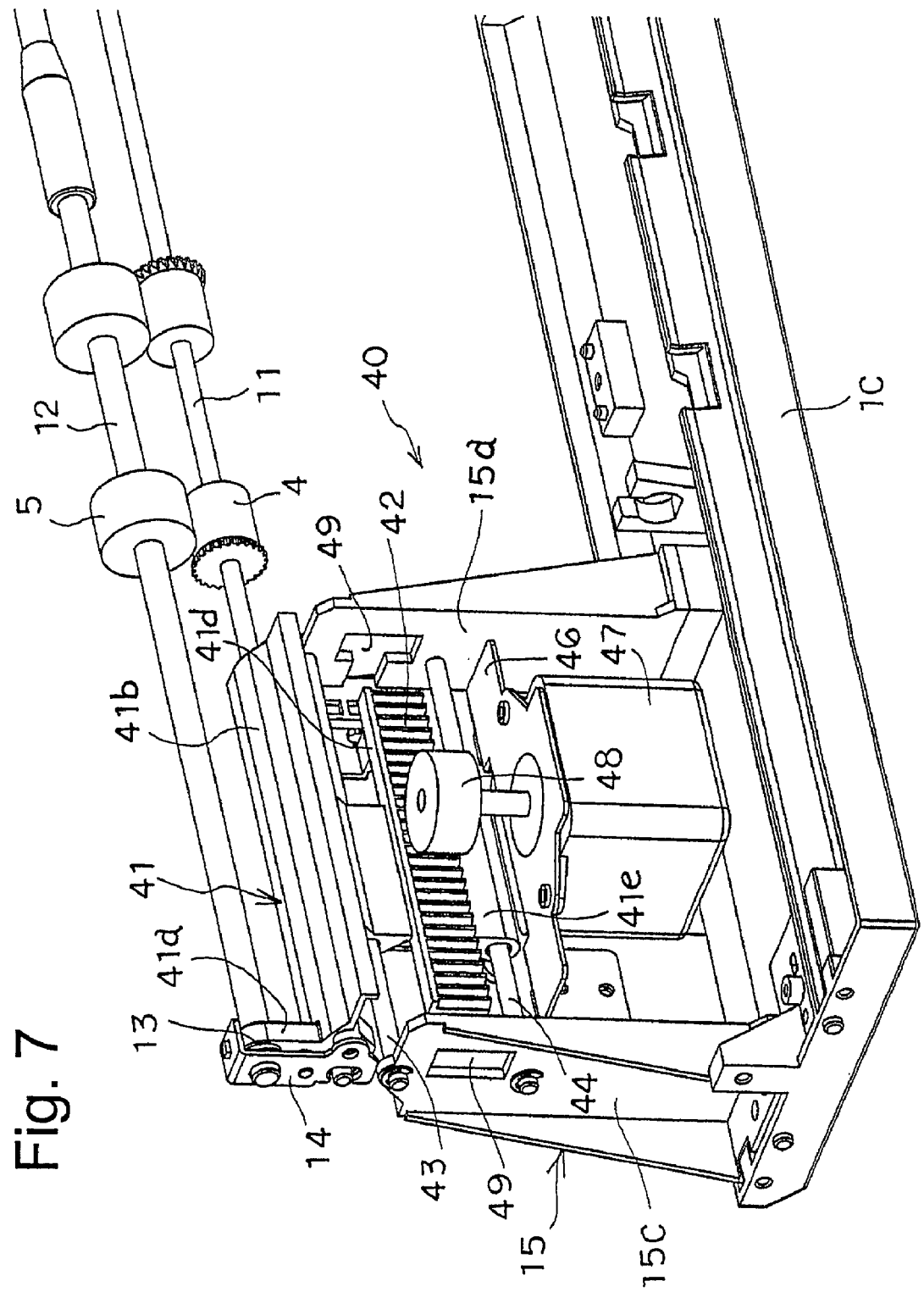
FIG. 7 is a perspective view seen from the inside of the apparatus showing sheet shift means (also used as preparatory (pre-) alignment moving means and sorting means) disposed in the stand frame shown in FIG. 5.

As already described, as shown in FIG. 7, the sliding joint plate 41 as a constituent of the preparatory (pre-) alignment movement means 40 is equipped with the head portion 41*b* forming a guide surface for the sheet; the ear portion 41*a* established and protruding on the upper surface of the head portion; the neck portion 41*c* vertically downward in the lower surface of the head portion 41*b*; the rectangular torso portion 41*d* extending from the neck portion; and one leg portion 41*e* formed to have approximately the same thickness as the neck portion. Also, the neck portion 41*d* and the leg portion 41*e* are supported movably in the shaft direction by the two upper and lower guide rods 43 and 44 suspended in the horizontal direction between the side walls 15*a* and 15*c* of the U-shaped stand frame 15.

It is configured that the supporting shafts 11 and 12 are rotatably supported with the leading ends thereof inserted into the ear portion 41*a* of the sliding joint plate 41, and are integrated with the sliding joint plate 41 to slide together in the shaft direction.

Next, a configuration of the sliding drive portion 45 will be explained.

To configure the sliding drive portion 45, the rack 42 is established to the torso portion 41*d* of the aforementioned sliding joint plate 41 along the supporting shaft 11 direction. Also, a slide motor 47 is established to an inner wall of the stand frame 15 as a slide support frame via the mounting plate 46, and the pinion gear 48 mounted on the output shaft of the slide motor 47 engages the aforementioned rack 42.

In the sliding drive portion 45 of the aforementioned configuration, the pinion gear 48 rotates while engaging the rack 42 of the sliding joint plate 41 according to forward and reverse drive of the slide motor 47 controlled by control means described below, and transmits a drive to the sliding joint plate 41 along the guide rods 43 and 44. Finally, the supporting shafts 11 and 12 linked to the sliding joint plate 41 and the pair of the tray discharge rollers 4 and 5 mounted on each of the supporting shafts advance and retract.

In a different view, the sliding drive portion 45 is composed of the sliding joint plate 41 for rotatably linking the supporting shafts 11 and 12; the guide rods 43 and 44 for retractably supporting the sliding joint plate 41 in the shaft direction; the stand frame 15 mounted to the base frame 1*c* for supporting and fixing the guide rods 43 and 44; and the slide motor 47 equipped with the pinion gear 48 on the shaft. Furthermore, the sliding joint plate 41 is configured to include a linking portion (the ear portion 41*a*) for rotatably linking the supporting shafts 11 and 12, supporting portions (neck portion 41*c* and leg portion 41*e*) having shaft holes for inserting the guide rods 43 and 44, and the rack 42 for engaging the pinion gear 48 mounted on the rotating shaft of the slide motor 47.

Incidentally, a slide opening portion 49 is formed on the side walls 15*a* and 15*c* on the stand frame 15 that is a slide supporting frame, so that the rack 42 escapes toward outside of the side walls 15*a* and 15*c* on the stand frame 15 when the pinion gear 48 advances and retracts the sliding joint plate 41.

Figure 8:
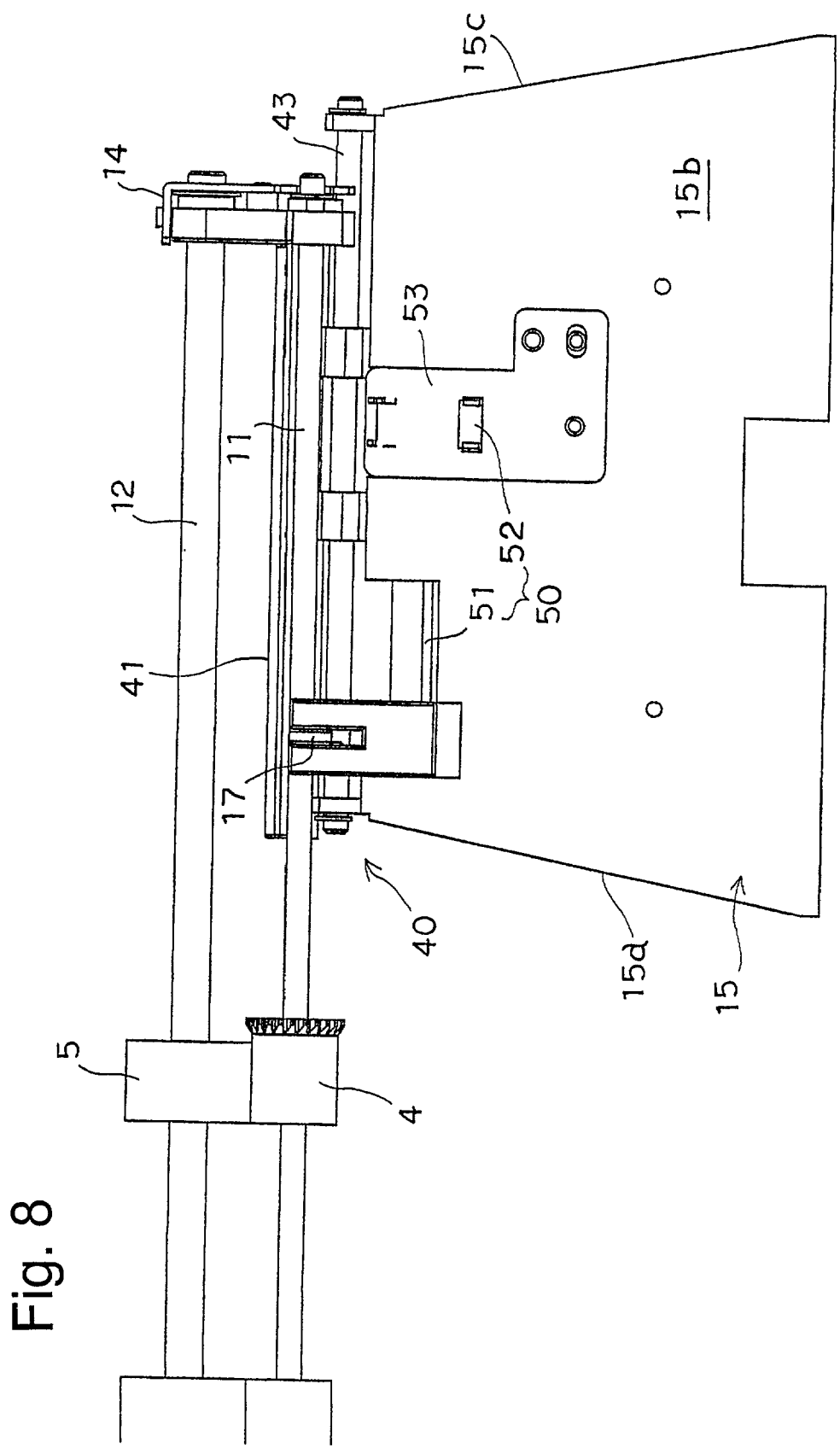
FIG. 8 is a view showing a position of an HP detection sensor to be established in the stand frame on the sheet finishing apparatus.
Figure 9:
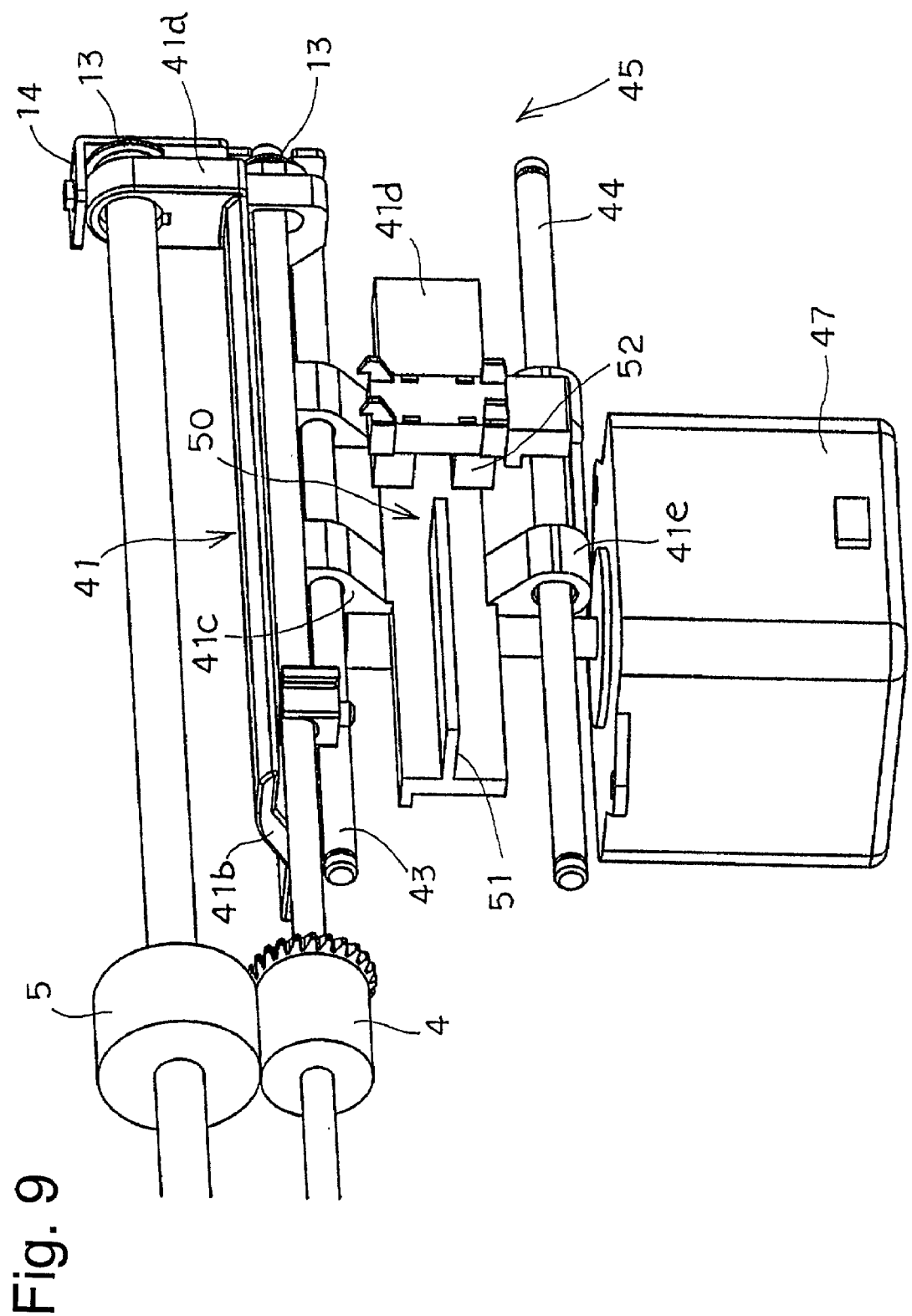
FIG. 9 is a perspective view showing a structure of the HP detection sensor.

Further, as shown in FIG. 9, a position detection protrusion 51 extending in a plate shape in the horizontal direction is established on a backside of the torso portion 41*d* on the sliding joint plate 41. The position detection protrusion 51 also functions to prevent warping of the sliding joint plate 41 due to bending. Also, as shown in FIG. 8 and FIG. 9, to the front wall 15*b* on the stand frame 15, an interrupter 52 (a pair of optical elements for emitting and receiving light) composing a transmission type optical sensor along with the position detection protrusion 51 is mounted via an auxiliary plate 53. Also, the transmission type optical sensor comprised of the position detection protrusion 51 and the interrupter 52 (a pair of optical elements for emitting and receiving light) function as an HP detection sensor 50 for detecting a home position (HP) of the sliding joint plate 41, namely the supporting shafts 11 and 12, and for turning on when the position detection protrusion 51 interrupts the light of the interrupter 52 (a pair of optical elements for emitting and receiving light).

In a conventional apparatus, a sheet starts to be discharged after sliding the discharge rollers in a state that the transport of the sheet is stopped after the pair of the discharge rollers nips the sheet. On the other hand, in the sheet finishing apparatus 1, it is possible to transmit the drive from the transport motor 34 via the linking gear 33 to the supporting shaft 12 even while the supporting shafts 11 and 12 are advancing or retracting in the shaft direction according to the aforementioned configuration. That is, the tray discharge roller 5 mounted on the supporting shaft 12 and the tray discharge roller 4 mounted on the supporting shaft 11 can advance and retract in the shaft direction at the same time the sheet is transported by the pair of the tray discharge rollers 4 and 5.

Through this configuration, it becomes possible to shorten a process time for the alignment and the sorting.

It is configured that the supporting shaft 11 linked to the supporting shaft 12 by the sliding joint plate 41 advances and retracts in the shaft direction by a sliding drive portion 45 (FIG. 9), described later, with penetrating a shaft hole of the discharge paddle 20, a shaft hole of the first slide regulating member 19 and the notched opening portion 38 established in the side frame 1*b* along with the supporting shaft 12, while leaving the discharge paddle 20, whose movement in the shaft direction is regulated by the first slide regulating member 19, between the first slide regulating member 19 and the second bearing member 18.

Through this structure, the tray discharge roller 4 mounted on the supporting shaft 11 advances and retracts in the shaft direction along with the tray discharge roller 5 that is the drive roller mounted to the supporting shaft 12. Also, it is configured that the tray discharge roller 4 nips and transports the sheet along with the tray discharge roller 5 upon advancing and retracting.

Furthermore, the supporting shaft 11 is formed in a D shape for at least a distance that the support shaft advances and retracts from both sides of the discharge paddle 20, and the shaft hole in the discharge paddle 20 also formed in a D shape. Through this structure, it is possible to transmit the rotation of the supporting shaft 11 to the discharge paddle 20 positioned between the first slide regulating member 19 by the sliding drive portion 45 even when the supporting shaft 11 is advancing and retracting along with the supporting shaft 12. As opposed to that the sheet is discharged while the pair of the tray discharge rollers 4 and 5 advances and retracts in the shaft direction along with the supporting shafts 11 and 12, the discharge paddle 20 is arranged to apply the discharge action to the sheet at a predetermined position between the first slide regulating member 19.

E. Alignment Means (Pulling Means) 60

The sheet finishing apparatus 1 comprises the alignment means 60 for securely pulling the sheet to a finishing position on the fixed stacking portion 8 and aligning the same. The configuration of the alignment means 60 will be described with reference to FIG. 16 to FIG. 19.

Figure 16:
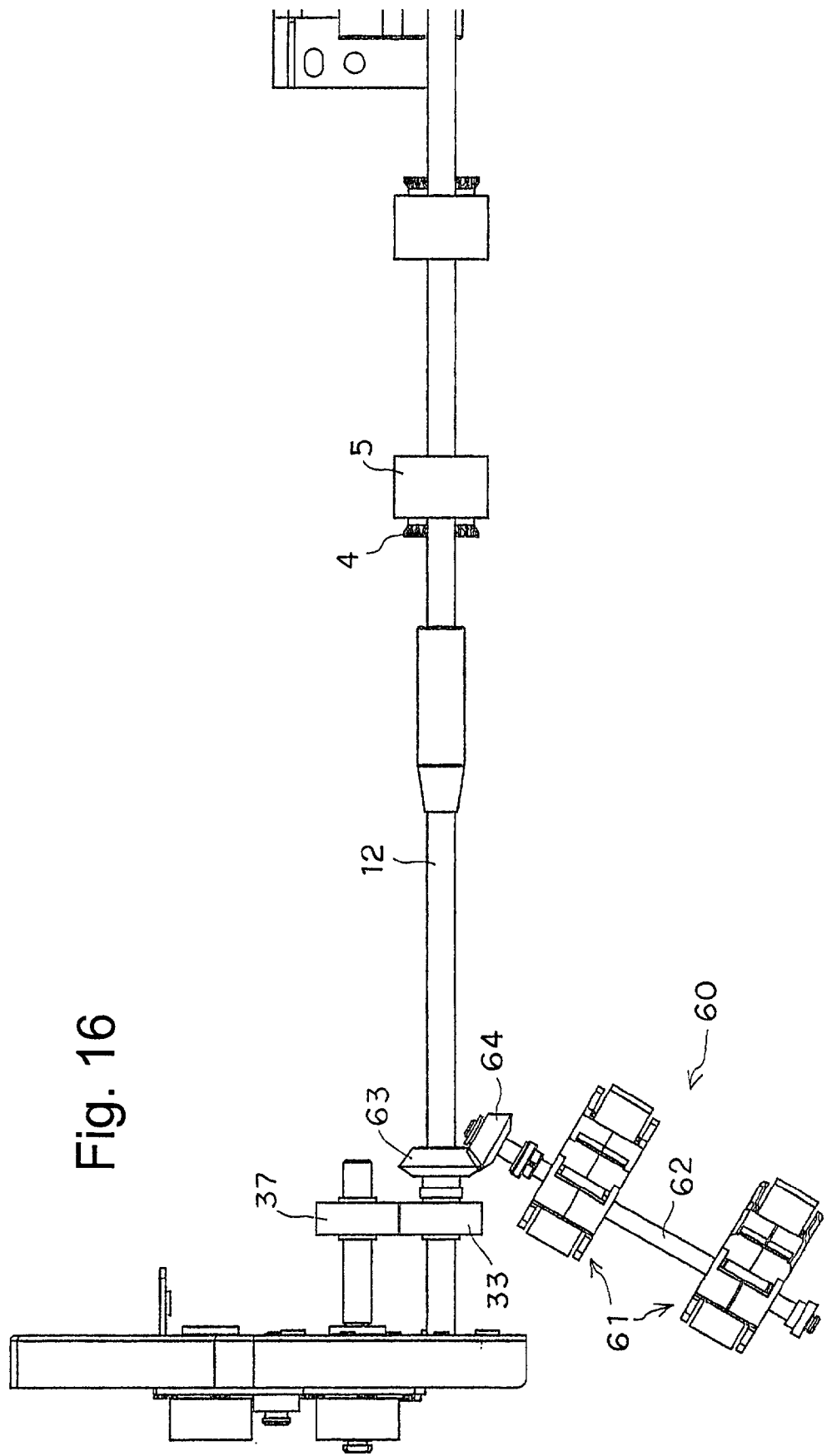
FIG. 16 is a plan view showing a power transmission system for rotating a belt unit support shaft added to the sheet finishing apparatus according to the present invention as alignment means.
Figure 17:
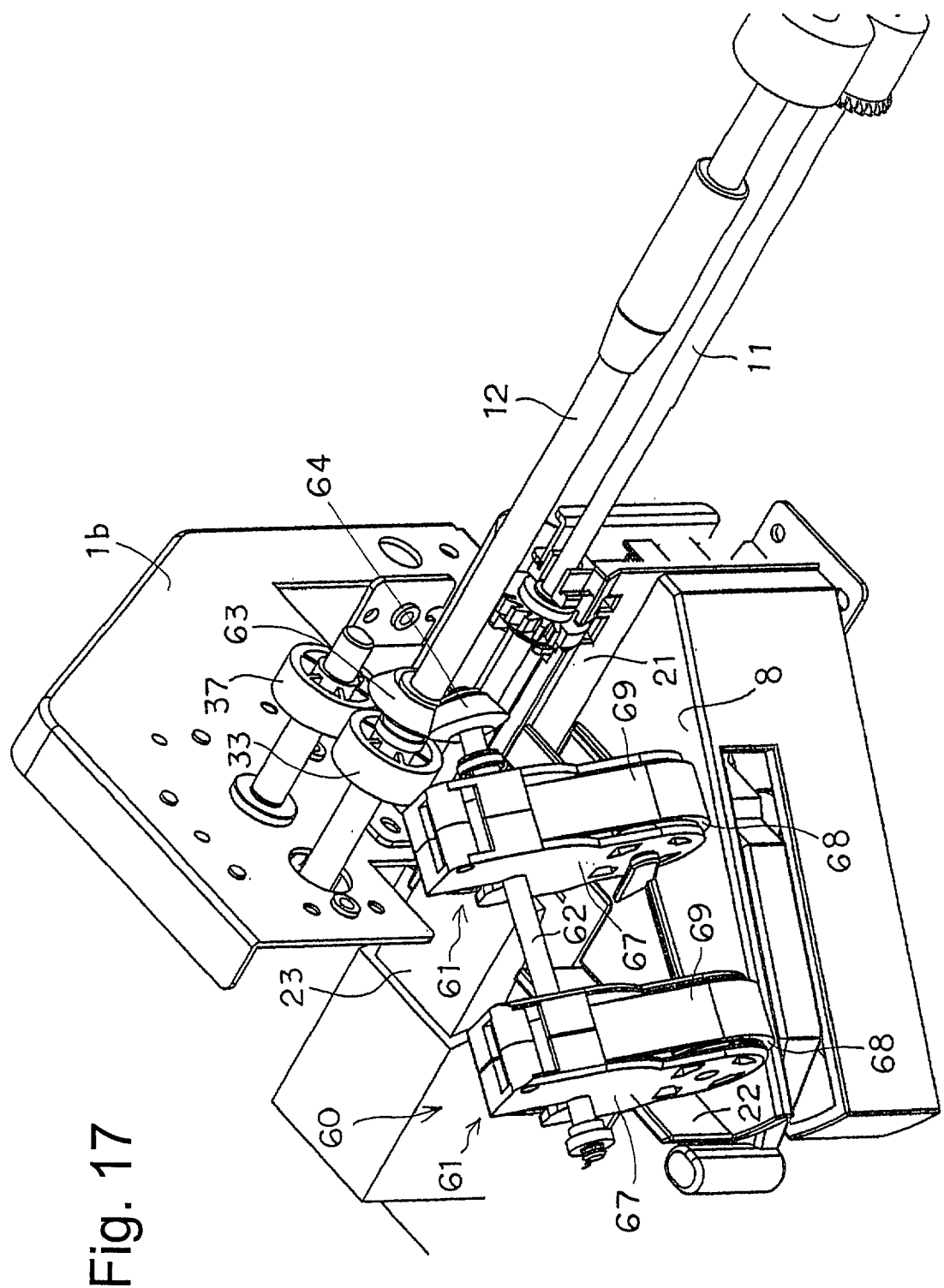
FIG. 17 is a perspective view showing a belt unit portion added to the sheet finishing apparatus according to the present invention as the alignment means.

As shown in FIG. 16 and FIG. 17, the alignment means 60 is composed of a belt unit 61 for sweeping the sheet to pull the same to the finishing position. According to this embodiment, two units are mounted in serial to the supporting shaft 62, to which the rotational drive force is applied from the aforementioned supporting shaft 12 at the upper side. These two belt units 61 and 61 are operated together by the forward rotation of the common supporting shaft 62. It is configured that the belt units urge and align the sheet, which is discharged while aligning at one side toward the preparatory (pre-) alignment position (a nipping position) or the width direction alignment reference position (the positioning plate 22) by the pair of the tray discharge rollers 4 and 5, to further move to a finishing position for accurate alignment determined by both the abutting plate 21 (the discharge direction alignment reference position) and the positioning plate 22 (the width direction alignment reference position).

Here, in this specification, the "preparatory (pre-) alignment position" is referred to a nipping position of the belt unit 61, and more accurately, the furthermost inner position of the nipping position where the belt unit 61 can nip the sheet.

As already described in FIG. 12, the upper supporting shaft 12 is a drive shaft rotated by the transport motor 34 via the linking gear 33 engaging the shaft and the force transmission mechanism (35*a* to 35*d* and 37). Furthermore, the linking gear 33 engaging the supporting shaft 12 is regulated its movement in the shaft direction of the supporting shaft 12 by the leg portion 32*a* of the second slide regulating member 32 and the downward wall 31*b* of the second supporting member 31 (see FIG. 10).

Figure 18:
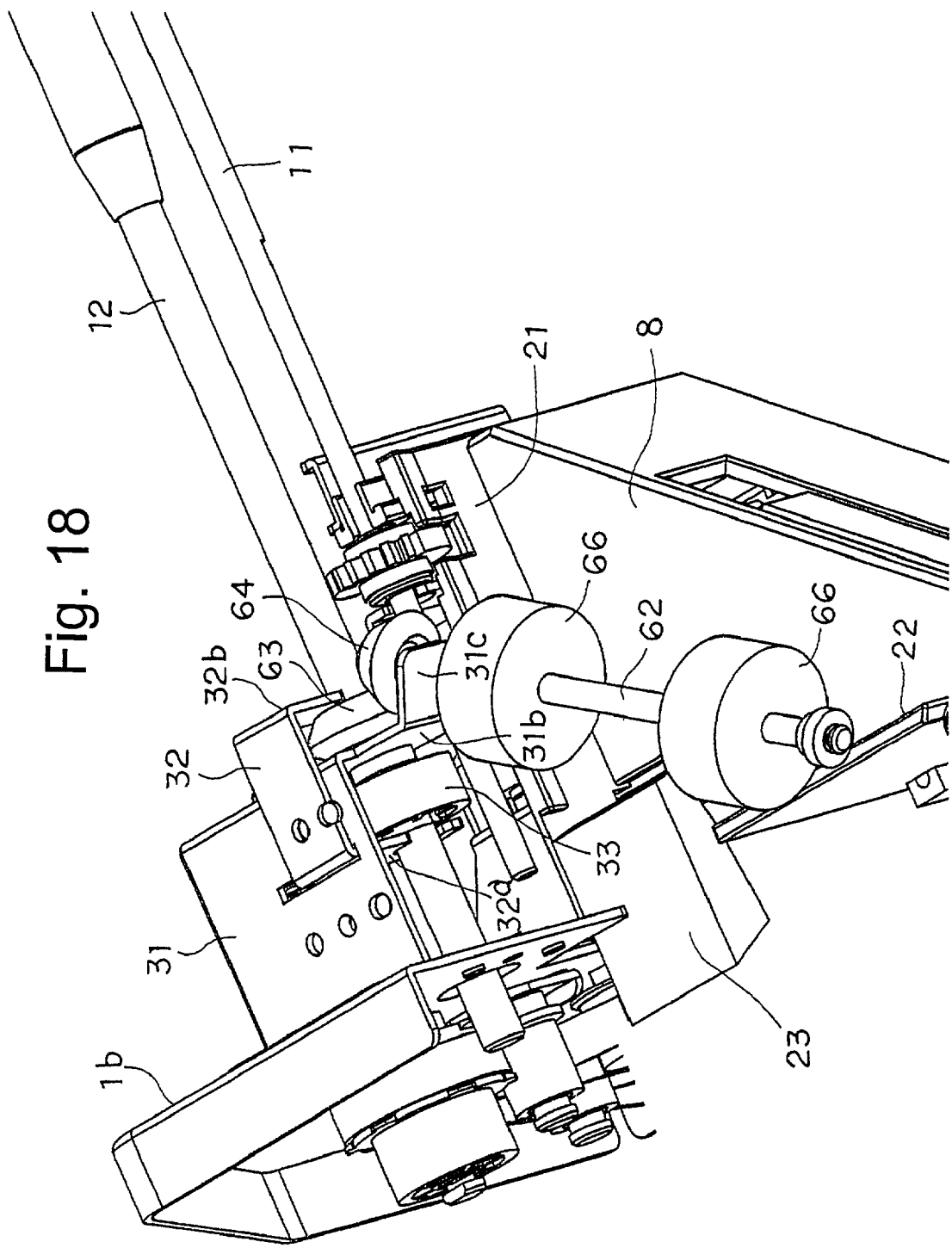
FIG. 18 is a perspective view showing the belt unit in FIG. 17 having only a drive pulley with a follower support pulley and an alignment belt removed.

To attain the drive force for the belt units 61 from the supporting shaft 12, in other words, to transmit the rotational drive force from the supporting shaft 12 to the supporting shaft 62, as shown in FIG. 16 and in FIG. 17, the first beveled gear 63 is disposed at inside from the linking gear 33 of the supporting shaft 12 in the shaft direction. As shown in FIG. 18 and in FIG. 19, the first beveled gear 63 is positioned between the downward wall 31*b* of the second supporting member 31 and the leg portion 32*b* of the second slide regulating member 32, thereby regulating its movement in the shaft direction of the supporting shaft 12 by the downward wall 31*b* of the second supporting member 31 and the leg portion 32*b* of the second slide regulating member 32.

On the other hand, the supporting shaft 12 penetrates a plurality of members and is retractably mounted in the shaft direction. That is, the supporting shaft 12 is arranged to freely advance and retract in the shaft direction, while penetrating a shaft hole of the linking gear 33, shaft holes of the leg portions 32*a* and 32*b* of the second slide regulating member 32, a shaft hole of the vertical downward wall 31*b* of the second supporting member 31, and the opening portion 39 established in the side frame 1*b*. Also, the supporting shaft 12 can slide in the shaft direction by the slide drive portion 45, while leaving the linking gear 33, whose movement in the shaft direction is regulated by the leg portion 32*a* of the second slide regulating member 32 and the vertical downward wall 31*b* of the second supporting member 31, in the regulating space. Further, the supporting shaft 12 can slide in the shaft direction, while leaving the first beveled gear 63, whose movement in the shaft direction is regulated by the vertical downward wall 31*b* of the second supporting member 31 and the leg portion 32*b* of the second slide regulating member 32, in the regulating space.

Note that the supporting shaft 12 is formed in a D shape for at least a distance that the support shaft advances and retracts from both sides of the linking gear 33 and the first beveled gear 63. Also, shaft holes of the linking gear 33, the discharge paddle 20 and the first beveled gear 63 are formed in a D shape.

On the other hand, to rotatably support one end of the supporting shaft 62 of the belt units 61, as shown in FIG. 12, an L shaped mounting plate 65 is mounted to the side frame 1*b*. One end of the supporting shaft 62 is rotatably supported to the mounting plate, while the other end of the supporting shaft 62 is rotatably supported to a support arm portion 31*c* established and extending from the vertical downward wall 31*b* of the second supporting member 31 to above the fixed stacking portion 8 (the first tray).

The second beveled gear 64 is mounted to an end of the supporting shaft 62 at a side of the support arm portion 31*c*. The second beveled gear 64 engages the first beveled gear 63, which is established and regulated its movement in the shaft direction at a predetermined position in the shaft direction of the supporting shaft 12. Through this structure, the supporting shaft 62 receives the drive from the transport motor 34 to rotate.

One of the two belt units 61 and 61 constituting the alignment means 60 is disposed at a position near the discharge outlet of the supporting shaft 62, and the other is disposed at the supporting shaft 62, far away from the discharge outlet 7. Since both of the belt units 61 and 61 have the same configuration, just one unit will be explained.

The belt unit 61 is composed of a drive pulley 66 (FIG. 18) mounted to the supporting shaft 62 and rotating along with the supporting shaft 62; support plates 67 (FIG. 17) disposed on both sides of the drive pulley with its back edge attached to the supporting shaft 62; a follower supporting pulley 68 (FIG. 19) rotatably supported on a front edge of the support plate 67 and positioned at a side of the fixed stacking portion 8 with a predetermined gap from the drive pulley 66; and an alignment belt 69 (FIG. 19) trained between the drive pulley 66 and the follower support pulley 68.

Figure 19:
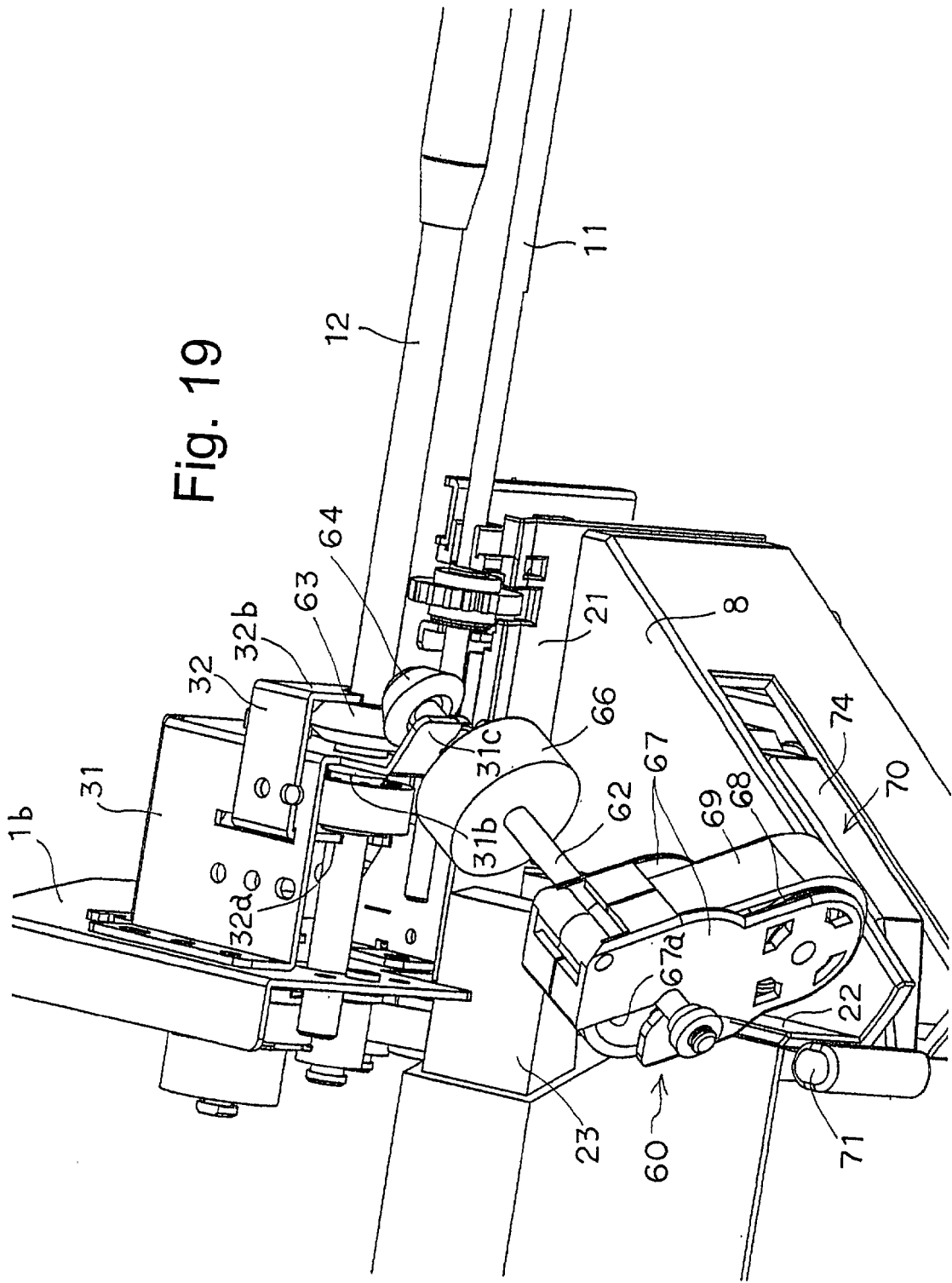
FIG. 19 is a perspective view showing one of a pair of the belt units in FIG. 17 having only the drive pulley.

The support plate 67, as shown in FIG. 19, comprises a notch 67a for engaging a trailing end thereof with the supporting shaft 62, and a back portion of the notch portion 67a detachably is mounted to the supporting shaft 62 with a constant gripping force. Therefore, the support plate 67 revolves as a unit with the supporting shaft 62 with a constant frictional force, and, is also configured to slide and rotate around the supporting shaft 62 when an external force enough to overcome the constant frictional force is applied.

When the supporting shaft 12 receives the drive of the transport motor 34 (FIG. 12) and the tray discharge roller 5 rotates in a direction to discharge the sheet S, the supporting shaft 62 is rotatably driven from the supporting shaft 12 and the alignment belt 69 of the belt units 61 rotates to sweep and pull the sheet. A direction of the rotation is toward where the alignment belt 69 intersects the positioning plate 22 and the abutting plate 21, in other words, the rotation in a direction to transport the sheet toward the stapler 23 as a finishing position. In other words, the belt unit 61 is arranged in a direction to be able to transport the sheet S toward the stapler 23 as the finishing position. The support arm portion 31c and the support plate 67 position the supporting shaft 62 so that the belt units 61, 61 urge and align the sheet discharged by the pair of the tray discharge rollers 4 and 5 toward the abutting plate 21 and the positioning plate 22 on the fixed stacking portion 8.

A length of the belt unit 61 from the supporting shaft 62 is determined to be longer than a distance from the supporting shaft 62 to a top surface of the fixed stacking portion 8 (the first tray). Therefore, when the belt unit 61 revolves along with the supporting shaft 62 by the frictional force, a leading end of the belt unit 61 touches the upper surface of the fixed stacking portion 8 (the first tray) from above with an angle (see FIG. 19). The belt unit 61 is unable to revolve further, and an idling position shown in FIG. 19 is maintained as the support plate 67 of the belt unit 61 overcomes the frictional force and slips with regard to the supporting shaft 62.

In the belt unit 61 at the idling position, a position where the alignment belt 69 touches the sheet is the preparatory (pre-) alignment position (the nipping position), described above. As described in FIG. 13 and FIG. 14, in an operating mode with the preparatory (pre-) alignment, the sheet is preparatorily (pre-) aligned to the preparatory (pre-) alignment position by the distance of D1 or d1 (the distance of D4 or d4), and moved to the finishing position by the distance of D2 or d2 (D5 or d5) by the belt units 61, thereby touching the abutting plate 21 and the position plate 22 to be aligned. Alternatively, the sheet is moved directly to the finishing position by the distance of D3 or d3 (D6 or d6) after passing through the preparatory (pre-) alignment position, thereby touching the abutting plate 21 and the position plate 22 to be aligned.

However, as long as the supporting shaft 12 is rotating forward, the alignment means (the pulling means) 60 operates constantly hanging downward at an angle toward the sheet from the supporting shaft 62, thus it acts as a load that applies a resistance force to the discharging sheet. For that reason, the sheet might be pushed back by a reverse transportation effect (pulling in) of the alignment belts 69, resulting in that an edge of the sheet toward the fixed stacking portion 8 is not completely discharged, or is arranged obliquely. To eliminate this problem, the discharge paddle 20 is established to the supporting shaft 11. That is, the discharge paddle 20 is disposed at a position corresponding to the fixed stacking portion 8 above the supporting shaft 11 and with respect to the first slide regulating member 19 mounted to the support member 16. The discharge paddle 20 touches the sheet portion corresponding to the fixed stacking portion 8 while rotating, thereby applying an additional discharging force to the aforementioned sheet portion (to forcibly push it out).

F. Sheet Bundle Discharge Means 70 (FIG. 21 to FIG. 23)

As described above, the sheet passes through the preparatory (pre-) alignment (the preparatory (pre-) alignment movement means 40) and the alignment (the belt units 61), and is aligned sequentially at the finishing position and stacked. When the stacked sheets become a sheet bundle having a determined number of the sheets, the stapling operation as the finishing means is performed on a single corner by the stapler 23. The sheet bundle 90, as shown in FIG. 20, is stacked from the fixed stacking portion 8 (the first tray) to the storage tray 9 (the second tray) below. At this time, because there is a space, or a step, for stacking and storing the sheets between the fixed stacking portion 8 (the first tray) and the storage tray 9 (the second tray) below, the sheet bundle 90 has a bending portion 90a composed of a bent level along the level.

Figure 22:
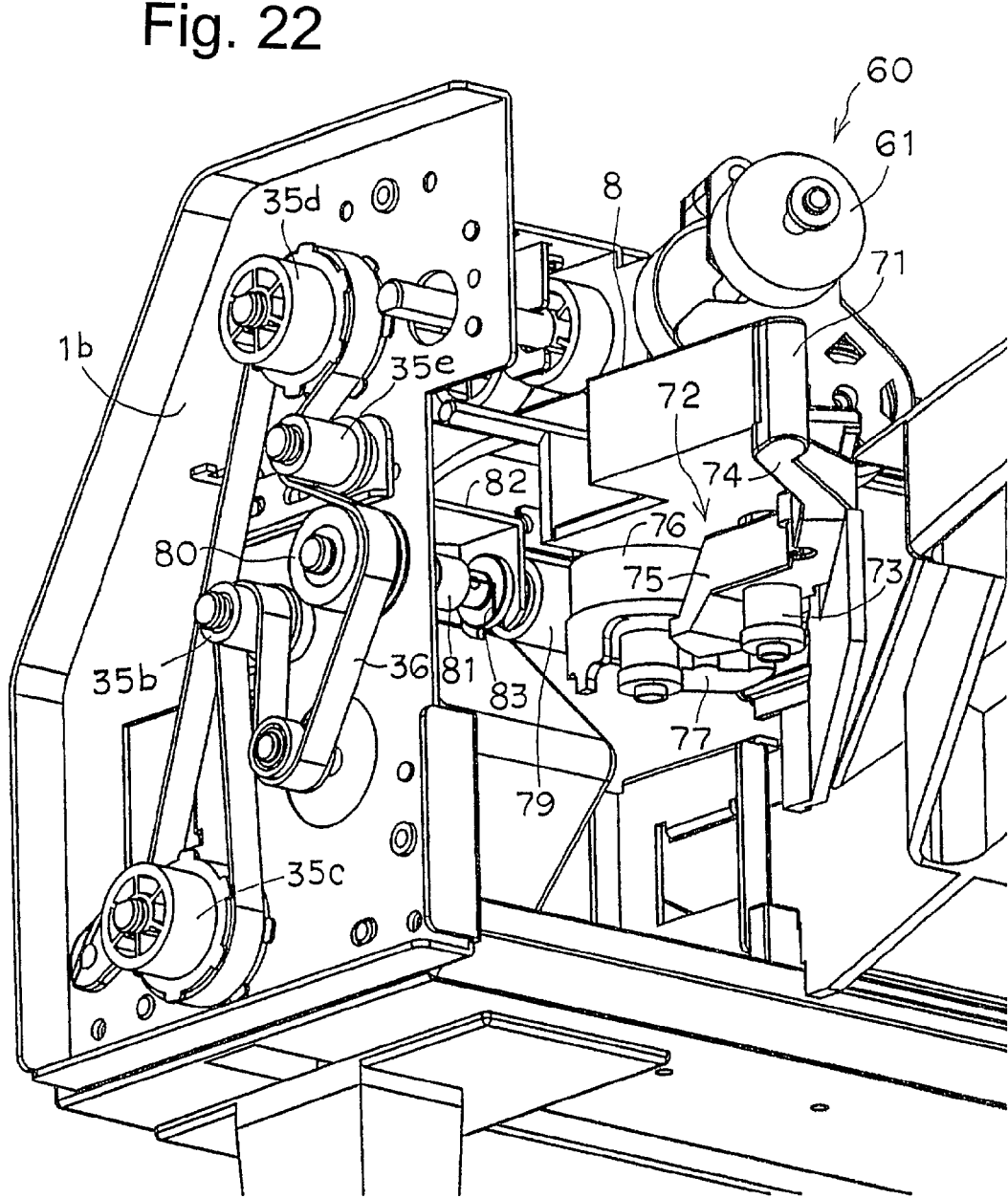
FIG. 22 is a perspective view seen from below showing a structure of the sheet bundle discharge means (the sheet moving means) in the sheet finishing apparatus according to the present invention.

The sheet bundle discharge means 70 shown in FIG. 21 to FIG. 23 is means to push the sheet bundle 90 in this state in the direction traversing the sheet transport direction from a side for discharging the bundle to a region outside of the fixed stacking portion 8 (the first tray). The sheet bundle discharge means 70, in this embodiment, is composed of a pushing member 71 engaging the curved portion 90a of the sheet bundle 90 for pushing the sheet bundle in a direction traversing the transport direction to move the bundle from the fixed stacking portion 8 (the first tray) to the storage tray 9 (the second tray) below, and a revolution drive mechanism 72 (drive means) for revolving the member.

To constitute the revolution drive mechanism 72, the rotating lever 74 that rotates around the rotating center 73 is disposed in a gap between the fixed stacking portion 8 (the first tray) and the storage tray 9 (the second tray) below, as shown in FIG. 21. The aforementioned pushing member 71 extending vertically in a form of a pushing bar is disposed at the leading edge of the rotating lever 74. The rotating lever 74 is equipped with a contact arm 75 formed of a contact portion 75a on the leading end thereof (FIG. 23) and extending obliquely downward at a side opposite to the rotating center shaft 73.

Further, to rotatably drive the aforementioned rotating lever 74, a worm-wheel 76 with a cam having a cam 77 that acts on the contact portion 75a is rotatably mounted on a circumference of the shaft 78 near the contact portion 75a. When the worm-wheel 76 with the cam reciprocally rotates around the shaft 78 as described below, it is configured that the cam 77 touches the aforementioned contact portion 75a to revolve in a predetermined fashion. Also, a worm gear 79 engaging the worm wheel 76 with the cam is established on a side opposite to a side where the aforementioned rotating lever 76 exists. The worm gear 79 is established on a shaft 81 having a pulley with a single direction clutch 80, and the pulley with the single direction clutch 80 is arranged as one of a gear chain composing the rotating drive mechanism of the aforementioned supporting shafts 11 and 12.

That is, as shown in FIG. 22, a shaft 81 of the pulley with the single direction clutch 80 is rotatably mounted to the side frame 1b and the support plate 82, and the intermediate pulley 35e is rotatably mounted to the side frame 1b. Then, a force transmission mechanism is configured such that the output from the transport motor 34 is transmitted from the motor pulley 35a mounted on the output shaft to the intermediate pulley 35b, the transport roller pulley 35c and the follower pulley 35d via the timing belt 36, and further to the pulley with the single direction clutch 80 via the intermediate pulley 35e. The aforementioned worm gear 79 engages the shaft 81 that is the output side of the pulley with the single direction clutch 80. Through the action of the single direction clutch, when the transport motor 34 is rotated forward, the single direction clutch turns off, causing the pulley with the single direction clutch 80 to rotate free. On the other hand, when the transport motor 34 is rotated in reverse, the single direction clutch turns on, thereby transmitting the rotational drive force to the shaft 81 to rotate the worm gear 79.

Figure 24A:
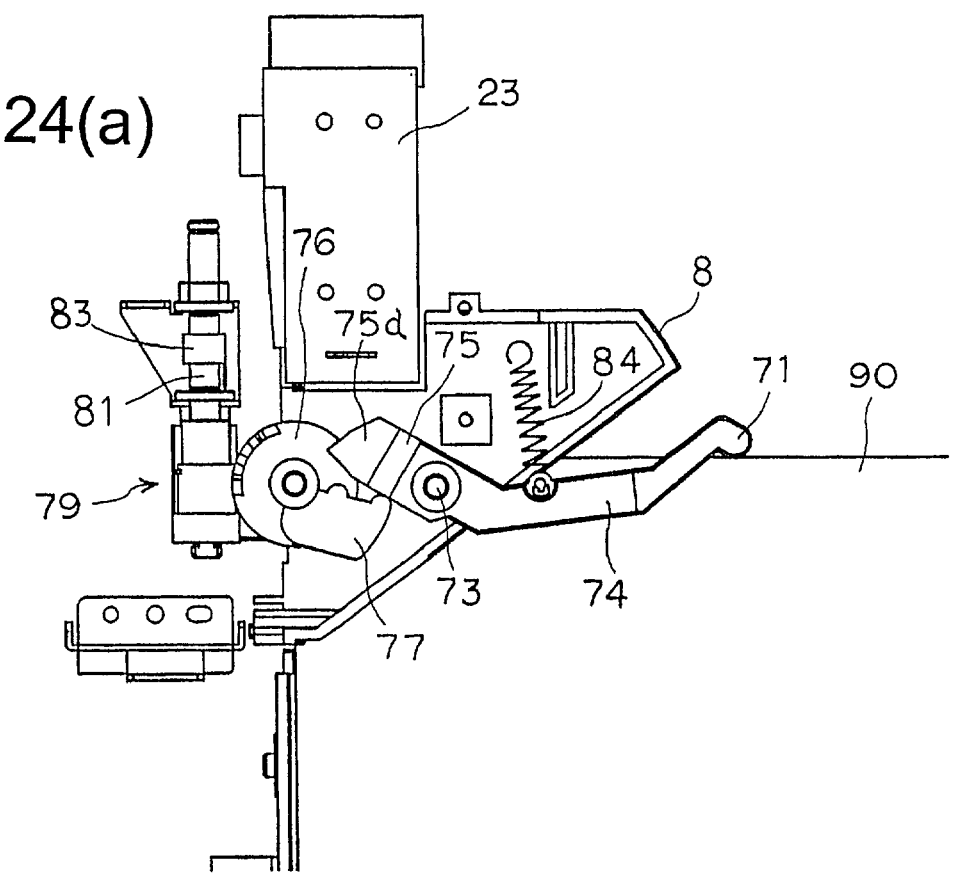
Figure 24B:
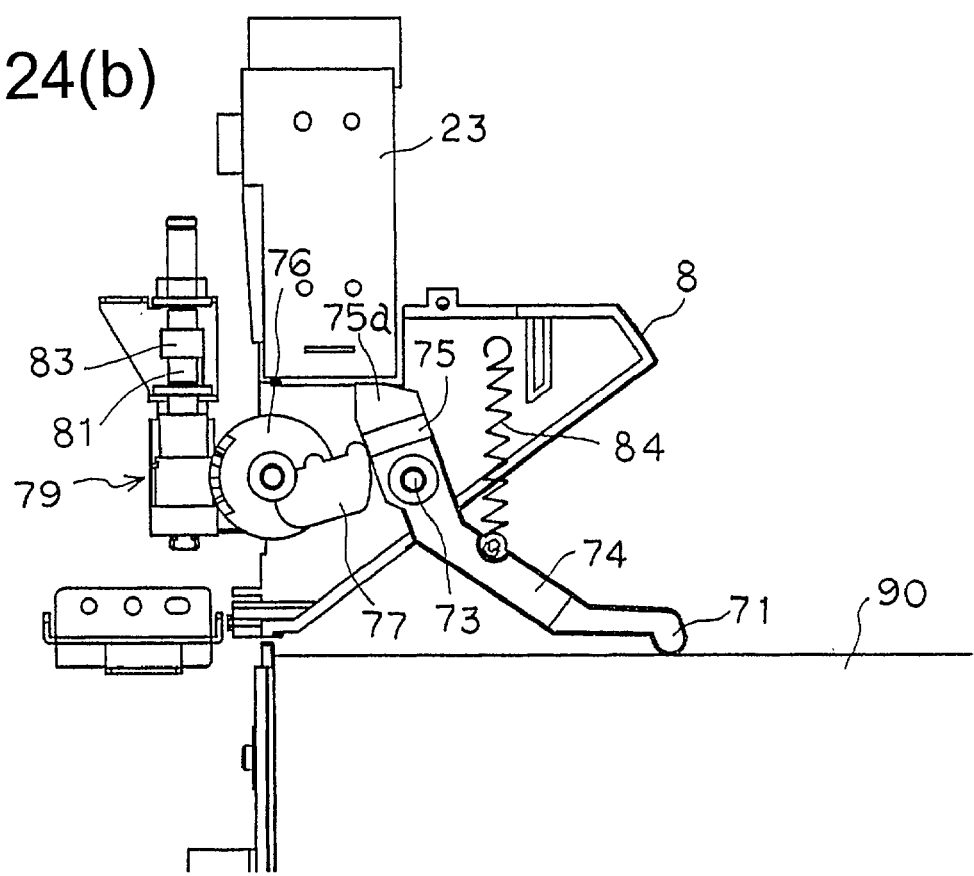

When the worm gear 79 rotates, the worm wheel with the cam 76 engaging the worm gear rotates. The cam 77 integrated with the worm wheel in the state shown in FIG. 23 touches and presses the contact portion 75a of the contact arm 75 to rotate the rotating lever 74 around the rotating center shaft 73 as depicted in FIGS. 24(a) and 24(b). Through this, the pushing member 71 revolves around the rotating center shaft 73 as depicted in FIGS. 24(a) and 24(b) to push the sheet bundle 90 to outside of the region of the fixed stacking portion 8 (the first tray).

Figure 25C:
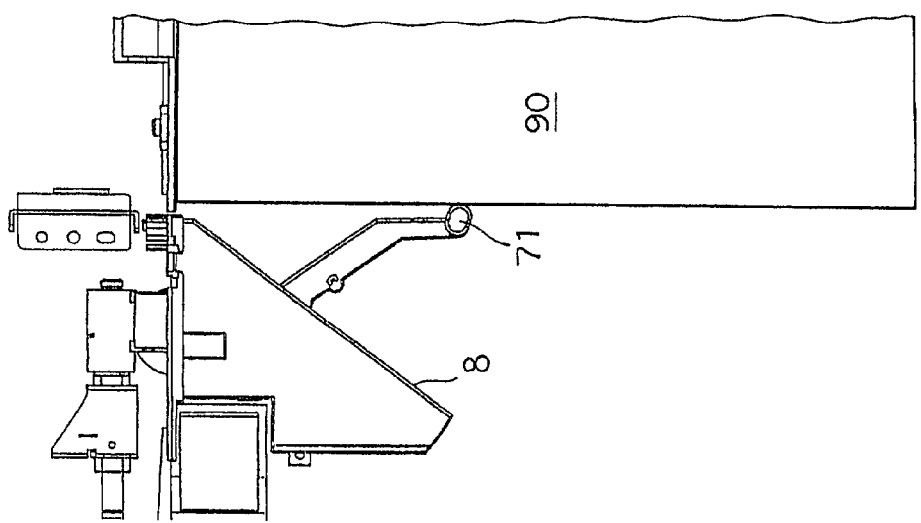
Figure 25B:
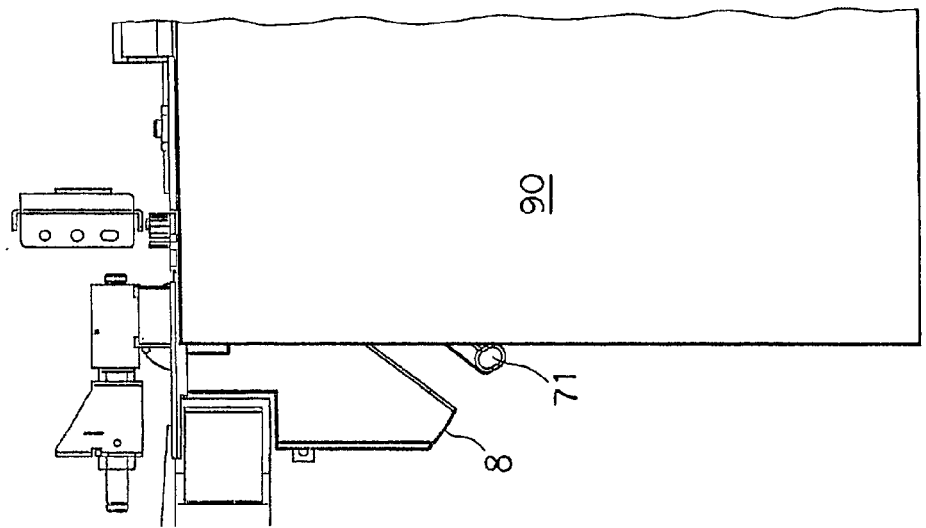
Figure 25A:
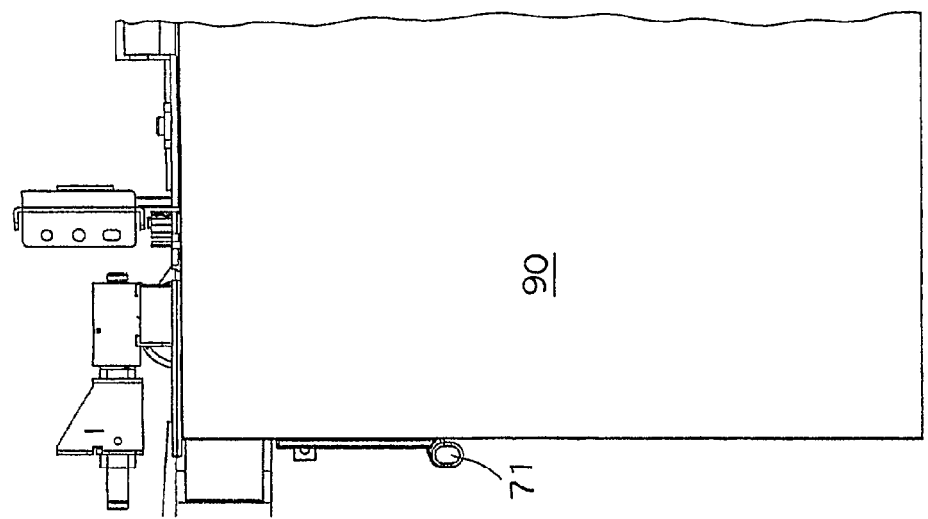

As a result, the sheet bundle 90, as shown in FIG. 25(a) to FIG. 25(c), is discharged from the fixed stacking portion 8 (the first tray) to the storage tray 9 (the second tray).

When the sheet bundle 90 reaches the position shown in FIG. 24(b) pushed out of the region of the fixed stacking portion 8 (the first tray), the rotational direction of the transport motor 34 switches from reverse to forward. The shaft 81 becomes free, and the recovery spring 83 mounted to the shaft 81 returns the worm wheel with the cam 76 to the state in FIG. 23. The rotating lever 74 also returns to the state in FIG. 23 by the action of the recovery spring 84.

The aforementioned elements 74 to 84 constitute the mechanism (revolving drive mechanism 72) for driving and revolving the pushing bar 72.

G. Control Means (a) Control Apparatus (FIG. 26)

The control means will be described next.

Figure 26:
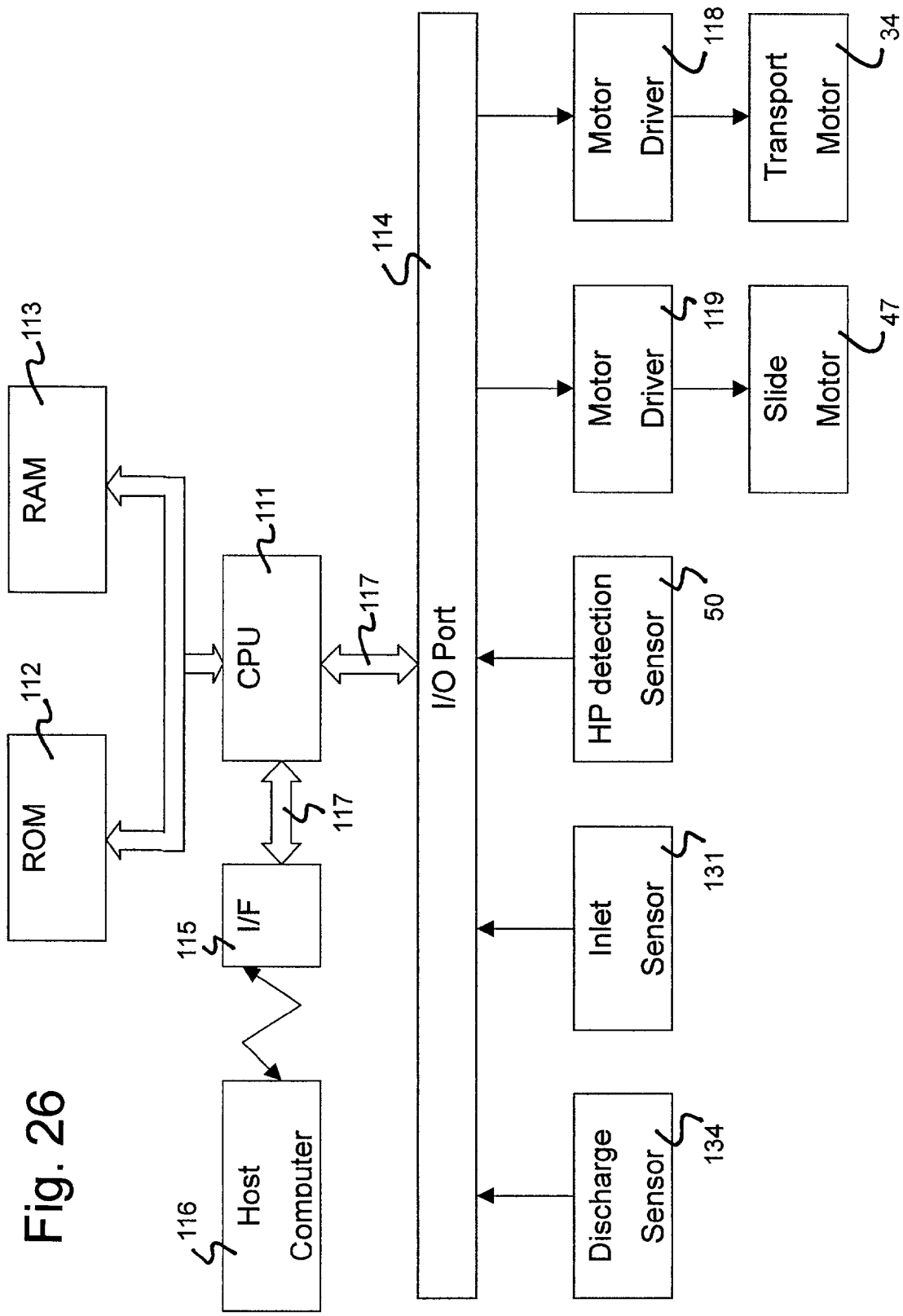
FIG. 26 is a drawing showing a configuration of a control apparatus on the sheet finishing apparatus according to the present invention.

FIG. 26 is a block diagram showing a circuit configuration of the sheet finishing apparatus according to this embodiment. 111 is a micro-computer CPU (a central processing unit) constituting a main body of the control unit; 112 is a ROM (a read only memory) storing program data that the CPU 111 uses to control each part; 113 is a RAM (a random access memory) provided with a memory for the CPU 111 to use for processing data; 114 is an I/O port; and 115 is an interface (I/F) for connecting externally a host computer 116 of the image forming apparatus main unit 100 using a communications line.

The aforementioned CPU 111, ROM 112, RAM 113, I/O port 114 and interface 115 are electrically connected via a bus line 117.

To the aforementioned I/O port 114 are connected the HP detection sensor 50 for detecting the home position of the supporting shafts 11 and 12 on the pair of the tray discharge rollers 4 and 5, an inlet sensor 131 (FIG. 2) established at an inlet of the paper path 2 that is a transport path, and a discharge sensor 134 established near the discharge outlet 7 of the paper path 2. The discharge sensor 134 is a sensor supplementary disposed and can be omitted.

The inlet sensor 131 and the discharge sensor 134 are composed of a transmission type light sensor including a light source and a light receptor element arranged to sandwich the sheet transport path, and turn on when the sheet passes therethrough and interrupts the light. That is, when the sheet S passing through the paper path 2 between the upper guide 2a and the lower guide 2b in the processing apparatus 1 is discharged, the detection sensors composed of the light source and the light receptor element arranged to sandwich the paper path 2 determine whether the each single sheet S passes through, thereby performing detection of a passing sheet and detection of a stalled sheet. Also, the detection sensor composed of the light source and the light receptor element arranged to sandwich the sheet discharge outlet 7 at downstream of the pair of the tray discharge rollers 4 and 5 detects whether the sheet S is discharged.

Further, the I/O port 114 is connected to a motor driver 118 of the transport motor 34, which drives the supporting shafts 11 and 12 of the pair of the tray discharge rollers 4 and 5 to rotate according to the data from the host computer 116, and a motor driver 119 of the slide motor 47, which moves the supporting shafts 11 and 12 of the pair of the tray discharge rollers 4 and 5 in the shaft direction according to the data from the host computer 116.

The aforementioned transport motor 34 and slide motor 47 are comprised of, for example, stepping motors. The CPU 111 controls the drive by sending a motor control signal with a predetermined number of pulses to the motors 34 and 47.

An output from each of the inlet sensor 131, the discharge sensor 134 and the HP detection sensor 50 is supplied to the CPU 111 of the micro-computer in the discharge apparatus. Also, information from operating means composed of a start key, a sorting sheet count setting key, a total recording count setting key and ten keys (not shown) in the image forming apparatus main unit 100 is input to the CPU 111 of the micro-computer in the discharge apparatus.

(b) Control (FIG. 27 to FIG. 30)

The aforementioned CPU 111 is configured to control the preparatory (pre-) alignment and the sheet finishing process shown in FIG. 27 to FIG. 30 based on a program.

Figure 27:
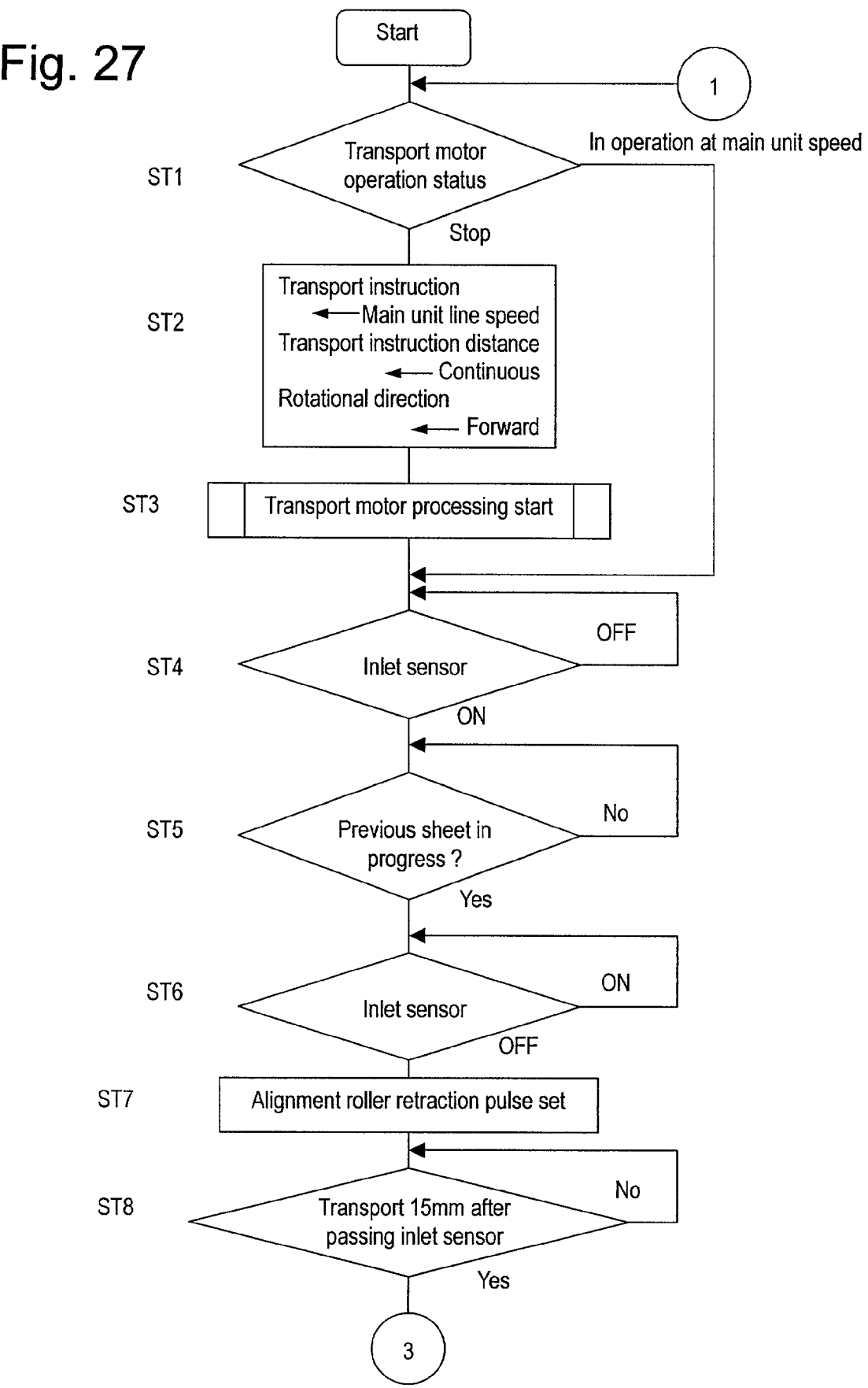
FIG. 27 is a chart showing a part of a control flow for performing the preparatory (pre-) alignment, the alignment and the sheet finishing process in the sheet finishing apparatus according to the present invention.

That is, at step ST1 in FIG. 27, a status of the transport motor 34 is checked, and starts the transport motor 34 to rotate in a forward direction if the motor is in idle (step ST2 and ST3). It waits until the sheet arrives at the inlet sensor 131 (step ST4).

Next, because a precedent sheet (a previous sheet) may exist in the paper path 2, it determines the presence of the sheet (if the previous sheet is being processed) (step ST5). It is possible to determine by monitoring the output of the aforementioned discharge sensor 134, however, a configuration employed here measures the transport time of the sheet or the number of pulses of the sheet after passing the inlet sensor 131.

Next, it waits until the trailing edge of the sheet passes the inlet sensor 131 (step ST6). This is to prevent an accident that the supporting shaft 11 and the supporting shaft 12 move in the shaft direction to slide the sheet despite the trailing edge of the sheet is still nipped by the pair of the transport rollers 3.

Once the trailing edge of the sheet passes the inlet sensor 131, it sets "an alignment roller retracting pulse", which is the number of pulses adjusted for the sheet to exit the pair of the tray discharge rollers 4 and 5 (step ST7). It waits until the sheet is transported by 15 mm after passing through the inlet sensor 131 (step ST8). This absorbs a chattering action caused by bounding of the sheet.

Figure 28:
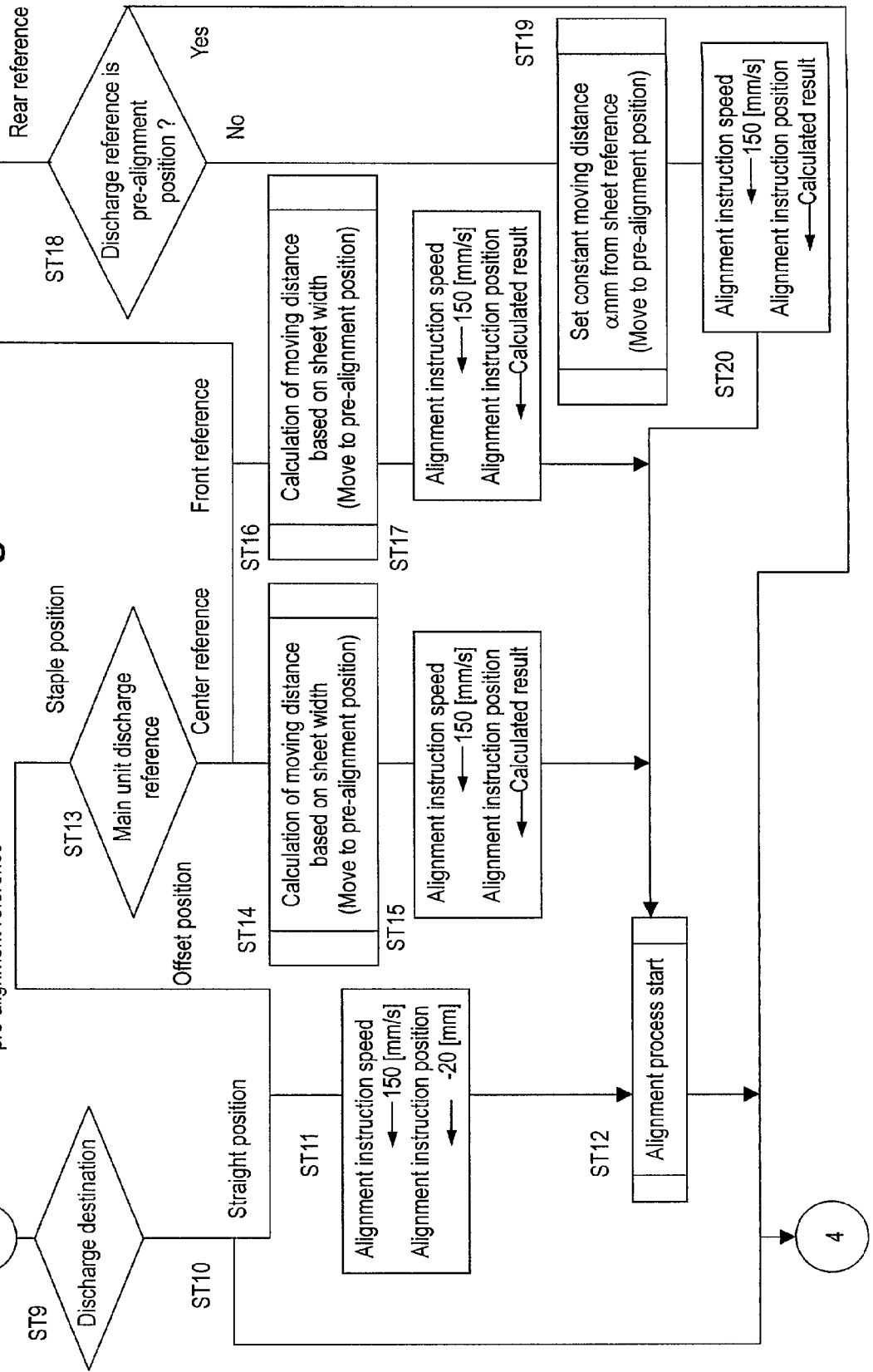
FIG. 28 is a chart showing a part of the control flow continued from FIG. 27 for performing the preparatory (pre-) alignment, the alignment and the sheet finishing process according to the present invention.

Next, in FIG. 28, based on the data and the instruction supplied from the image forming apparatus main unit 100, it checks a discharge destination to determine a reference of the discharge destination from a "straight position", an "offset position (a jog position)" or a "staple position."

In the case that the discharge destination is the "straight position", nothing happens to pass through the flow shown in FIG. 28 (step ST10).

In the case that the discharge destination is the "offset position (the jog position)", to ensure a predetermined offset movement amount and a jog movement amount, it is determined that an adjusted alignment speed is 150 mm/s and an adjusted alignment position is a position 20 mm offset to the right (−20 mm) from the HP (step ST11), and the alignment process is started to move to the position (step ST12).

In the case that the discharge destination is the "staple position", it checks whether the sheet is discharged from the image forming apparatus main unit 100 with either of the "center reference", the "front reference (one side edge reference discharge)" or the "rear reference (one side edge reference discharge)" based on the data and instructions received from the image forming apparatus main unit 100 (step ST13). Then, a distance of movement from each discharge reference to the preparatory (pre-) alignment position (the adjusted alignment position) is calculated, and the distance and the adjusted alignment speed (step ST14 to ST20) are determined. Then, the alignment process is started to move to the position (step ST12).

That is, in the case of the "center reference", the distance of movement to the preparatory (pre-) alignment position is calculated according to the width of the sheet (for example, D1 and D4 shown in FIG. 13). The result is set as the adjusted alignment position, and the adjusted alignment speed is set to be 150 mm/s (step ST15). Then, the alignment process is started to move to the position (step ST12).

Also, in the case of the "front reference (on side edge reference discharge)", that is, when discharging with the right edge of the tray as the reference shown in FIG. 36, the distance of movement to the preparatory (pre-) alignment position according to the width of the sheet is calculated (step S16) (for example, d7 and d9 shown in FIG. 36). The result is set as the adjusted alignment position, and the adjusted alignment speed is set at 150 mm/s (step ST17). Then, the alignment process is started to move to the position (step ST12).

Next, in the case of the "rear reference (one side edge reference discharge)" (step ST18), that is, when discharging with the right edge of the tray as the reference shown in FIG. 14, the distance of movement (a distance α) of the supporting shafts 11 and 12 in this discharge apparatus relative to the sheet is already known. Thus, the constant distance of movement α mm from the discharge reference (for example, d1 and d4 shown in FIG. 14) is set as the adjusted alignment position (step ST19), and the adjusted alignment position is set and the adjusted alignment speed is set at 150 mm/s (step ST20). Then, the alignment process is started to move to the position (step ST12).

However, when the discharge position itself matches to the preparatory (pre-) alignment position, the preparatory (pre-) alignment is not necessary, thus it skips to the alignment process as it is (step ST12).

In the alignment process, the sheet is actually moved only by the aforementioned calculated distance, and the alignment process is started to send the sheet to the preparatory (pre-) processing position (step ST12). Through this process, while the sheet is transported and discharged by the rotation of the pair of the tray discharge rollers 4 and 5, the pair of the tray discharge rollers 4 and 5 moves in the shaft direction executed by the aforementioned alignment process, thereby pushing the sheet to the nipping position of the belt units 61 that is the preparatory (pre-) alignment position.

Figure 29:
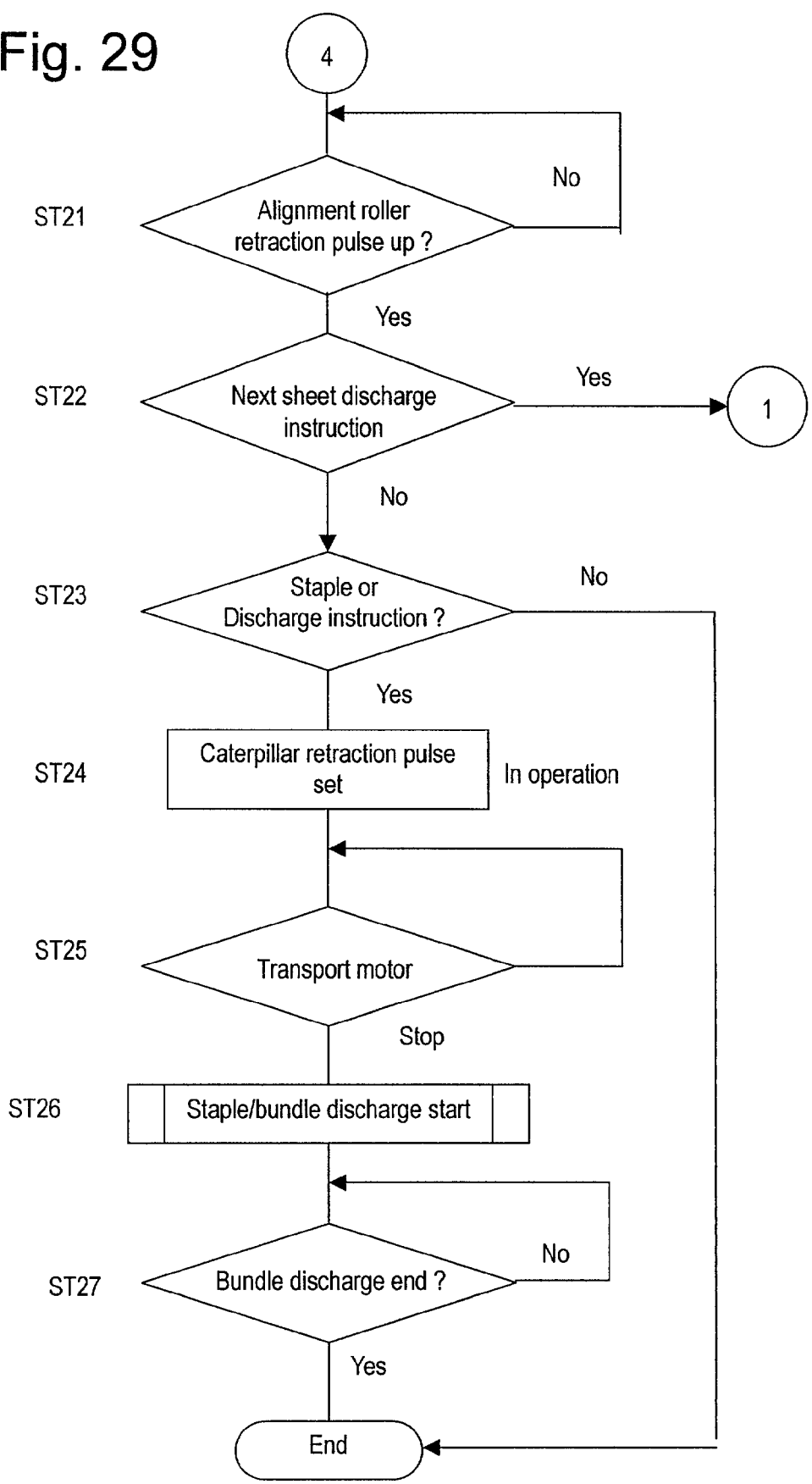
FIG. 29 is a chart showing a part of the control flow continued from FIG. 28 for performing the preparatory (pre-) alignment, the alignment and the sheet finishing process according to the present invention.

Then, in FIG. 29, when the "alignment roller retracting pulse" set at the aforementioned step ST11 is counted up, and it is verified that the sheet passes the pair of the tray discharge rollers 4 and 5 (step ST21), it checks if there is a request for discharging the next sheet, that is, if there is the sheet to be discharged (step ST22). In the case that there is the request for discharging the next sheet, it returns to step ST1, and the sheet to be discharged next is stacked and aligned.

After a predetermined number of the sheets are stacked, and it is determined that there is no request for discharging the next sheet at step ST22, it verifies if there is a staple instruction (step ST23). If there is no staple instruction, the process is completed (step ST23).

In the case that there is the staple instruction in determining at step ST23, it sets the pulling pulse count, in other words, the necessary pulse count to pull the sheet from the preparatory (pre-) alignment position (the nipping position) to the finishing position to perform the alignment (pulling to the finishing position) using the caterpillar (the belt units 61 and 61) as the alignment means (the pulling means) 60 (step ST24).

Then, it waits for the transport motor 34 and the slide motor 47 to stop (step ST25) and starts the "staple/bundle discharge process" routine.

Figure 30:
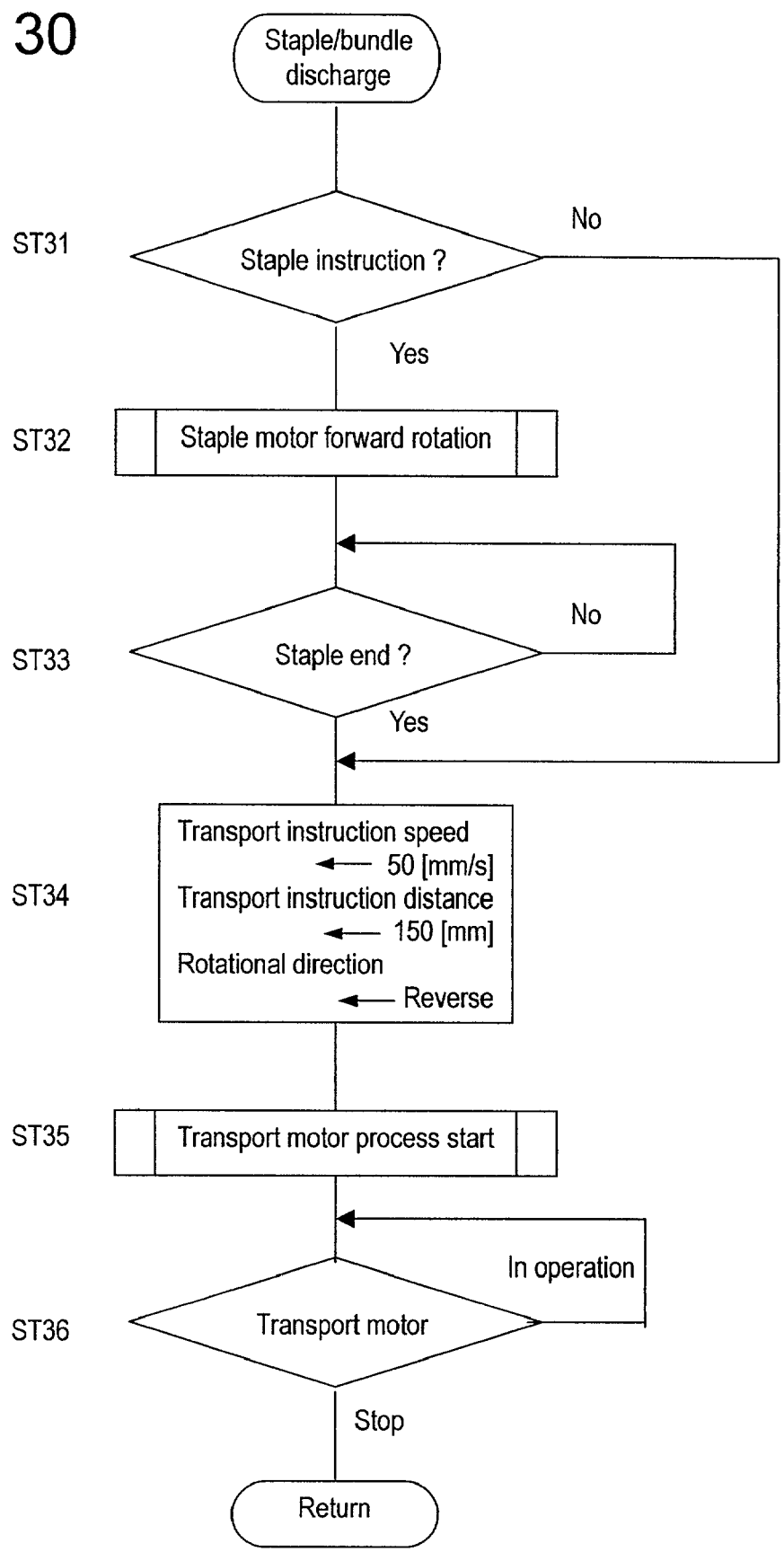
FIG. 30 is a chart showing a control flow for performing the stapling/sheet bundle discharge defined in FIG. 29 according to the present invention.

FIG. 30 shows a flow of the staple/sheet bundle discharge process. In the staple/sheet bundle discharge process, first it is determined whether there is a stapling instruction (step ST31). In the case that there is the stapling instruction, the staple motor (not shown in the drawings) is rotated to execute the finishing process (step ST32). In the finishing process, the stapler 23 as the finishing means staples the sheet bundle to finish the stapling and the stapling is completed (step ST33).

In the case that there is no instruction to staple (step ST31), steps ST32 to ST33 are not processed and it proceeds to the next sheet bundle discharging process (steps ST34 to ST36).

At step ST34, to switch the rotational direction of the transport motor 34 from previous forward to reverse, the rotational direction is set to be "reverse". Also, the transport motor 34 is started after setting the transport request speed at 50 mm/s and the transport supply distance at 140 mm.

Because the transport motor 34 is rotated in reverse, the aforementioned pulley with the one-way clutch 80 of the sheet bundle discharge means 70 turns on to transmit the rotational force of the transport motor 34 to the shaft 81. The worm gear 79 rotates the worm wheel the cam 76, and the cam 77 unitized with the worm wheel presses the contact portion 75a of the contact arm 75 to rotate the rotating lever 74 around the rotating center shaft 73. Through this process, the pushing member 71 revolves around the rotating center shaft 73 to push the sheet bundle 90 to the outside of the region of the fixed stacking portion 8 (the first tray) as depicted in FIG. 25(a) to FIG. 25(c). Through this process, the sheet bundle 90 is discharged from the fixed stacking portion 8 (the first tray) to the storage tray 9 (the second tray).

When the sheet bundle discharge operation is completed (step ST36), the series of the operations from the discharge to the preparatory (pre-) alignment, the alignment, the finishing (stapling) and the sheet bundle discharge is completed.

Figure 31:
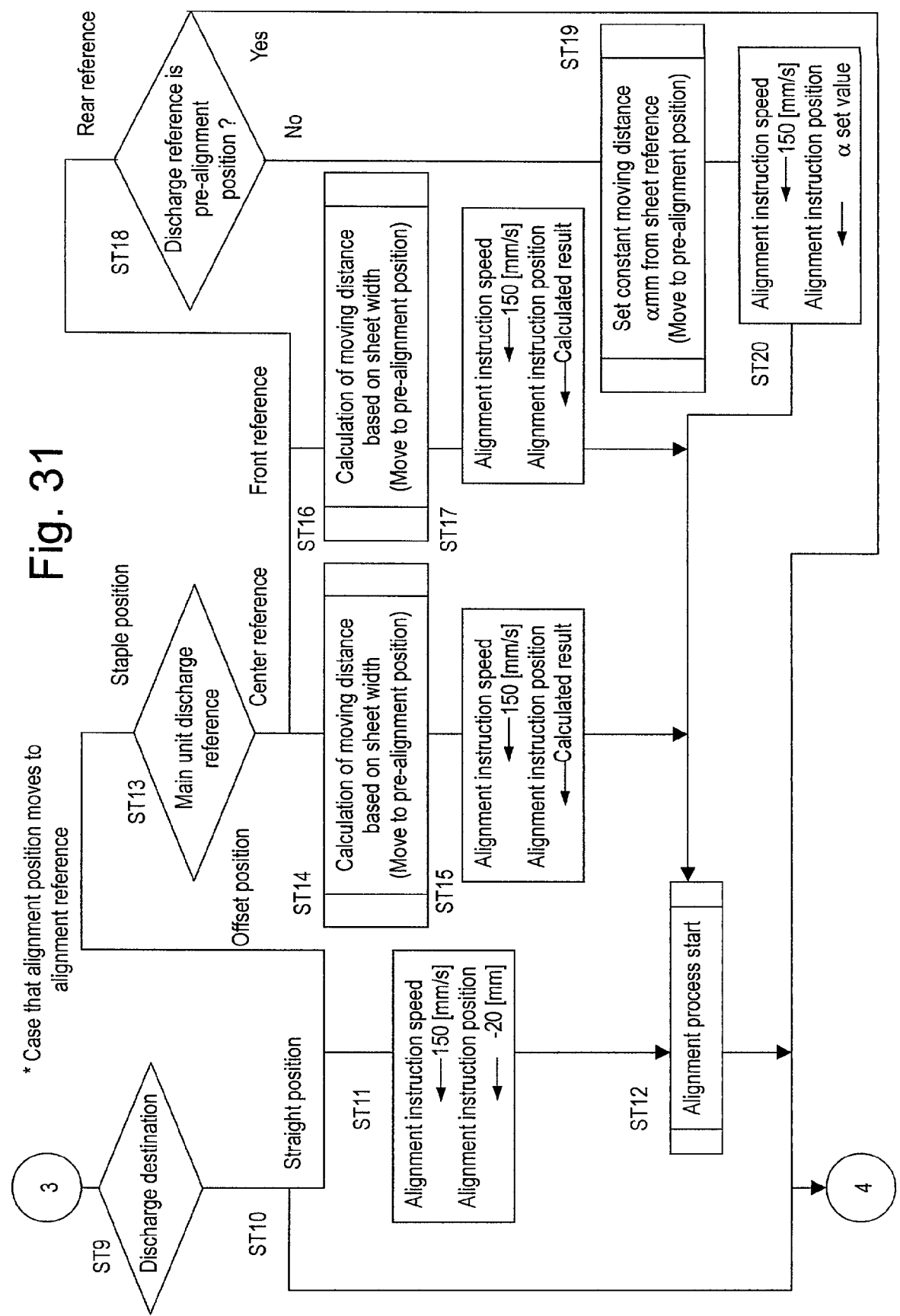
FIG. 31 is a chart showing a portion of another control flow for performing the alignment and the sheet finishing process (without the preparatory (pre-) alignment) corresponding to FIG. 28 in the sheet finishing apparatus according to the present invention.
Figure 32:
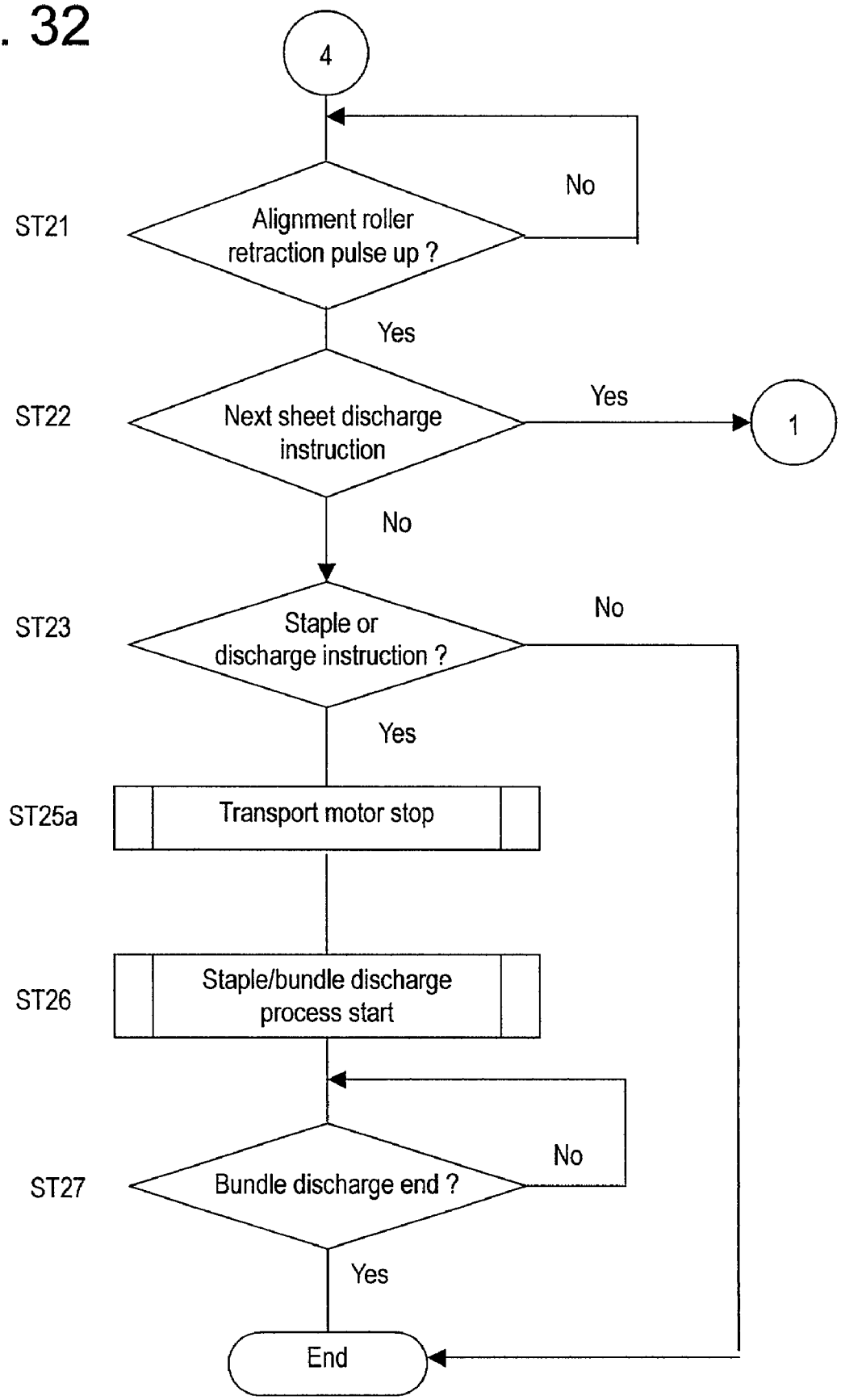
FIG. 32 is a chart showing a portion of another control flow continued from FIG. 31 for performing the alignment and the sheet finishing process (without the preparatory (pre-) alignment) in the sheet finishing apparatus according to the present invention.
Figure 33:
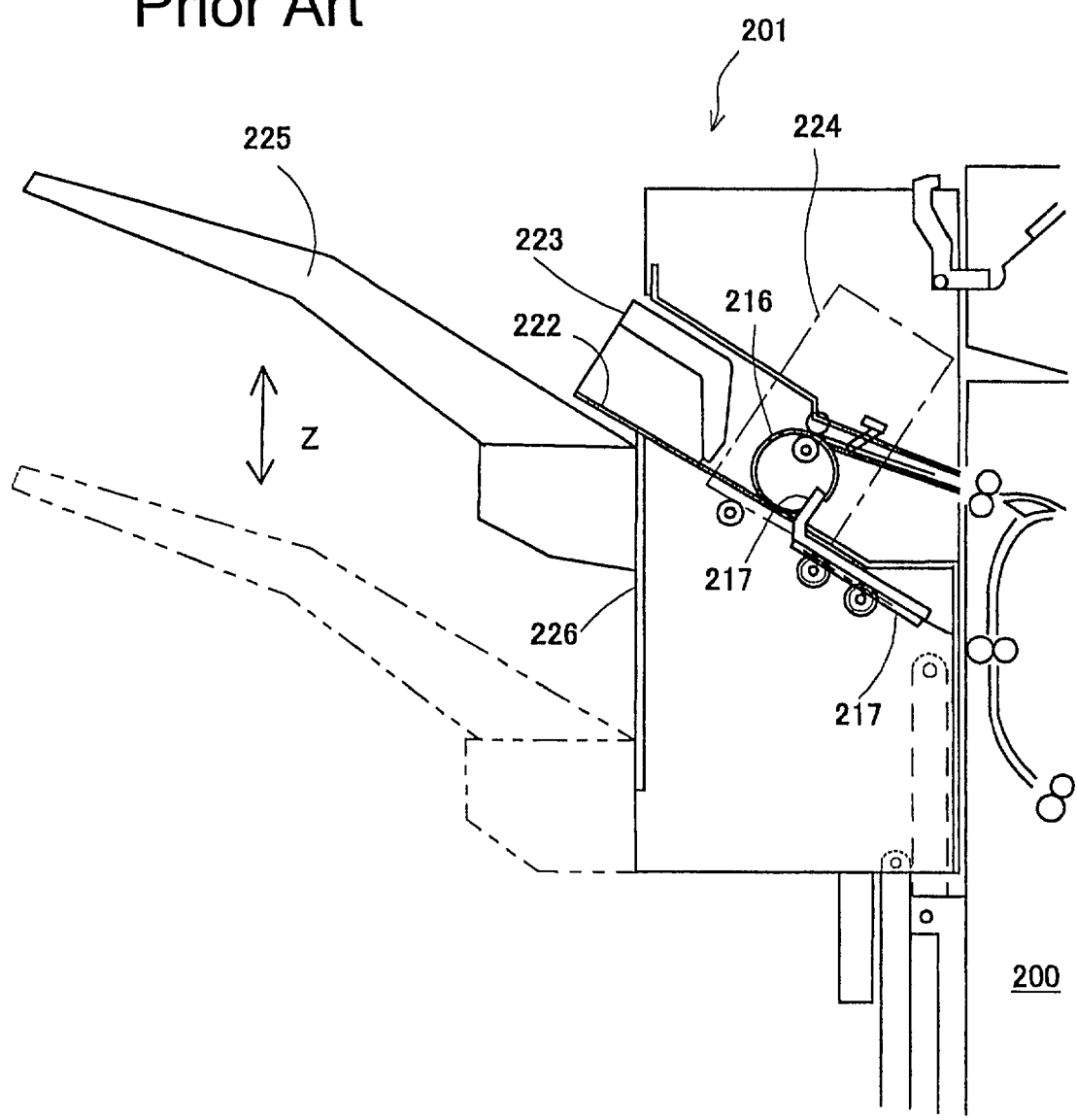
FIG. 33 is a side view showing a configuration of a conventional sheet finishing apparatus.
Figure 34:
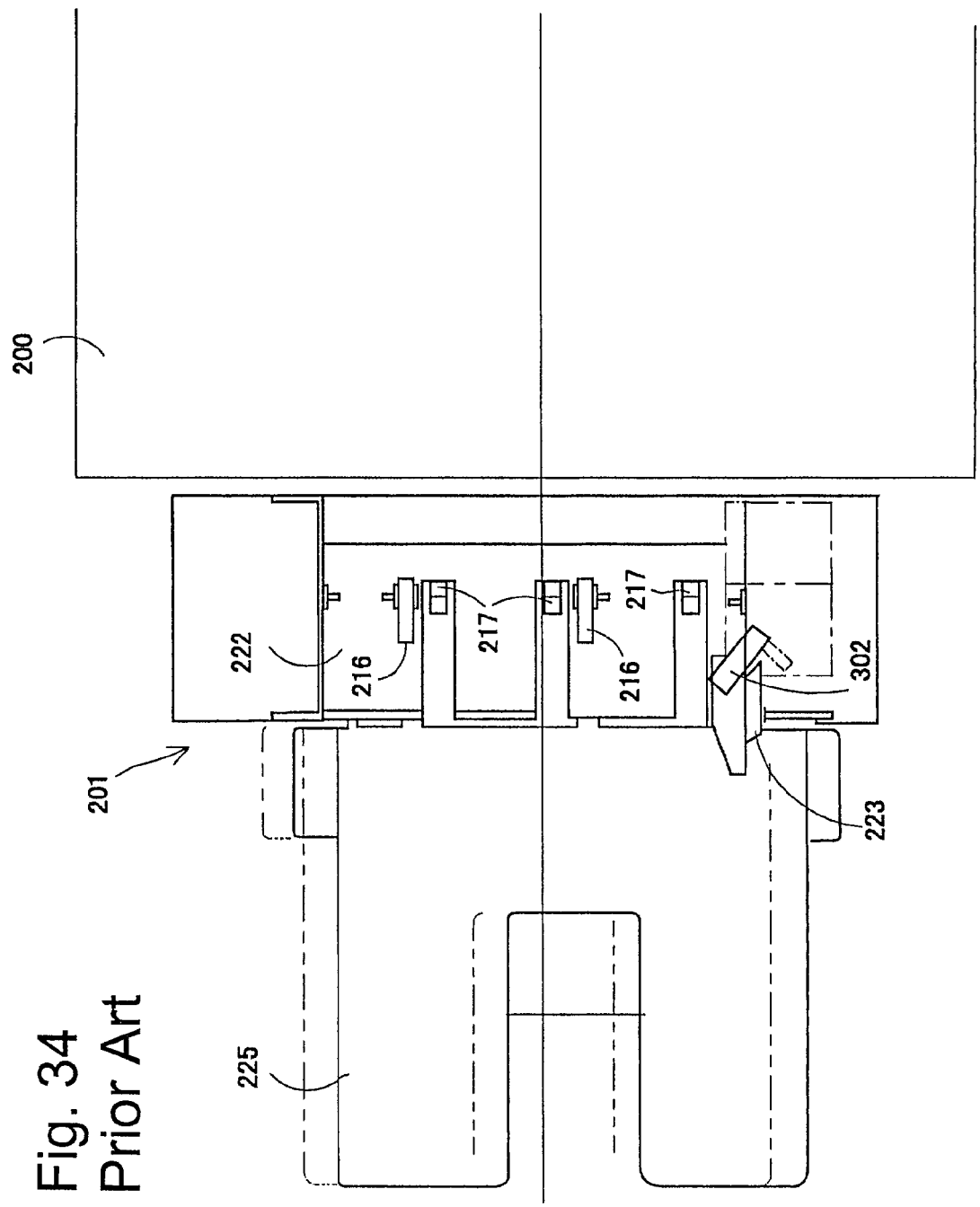
FIG. 34 is a view seen from above showing the configuration of the conventional finishing apparatus.
Figure 35A:
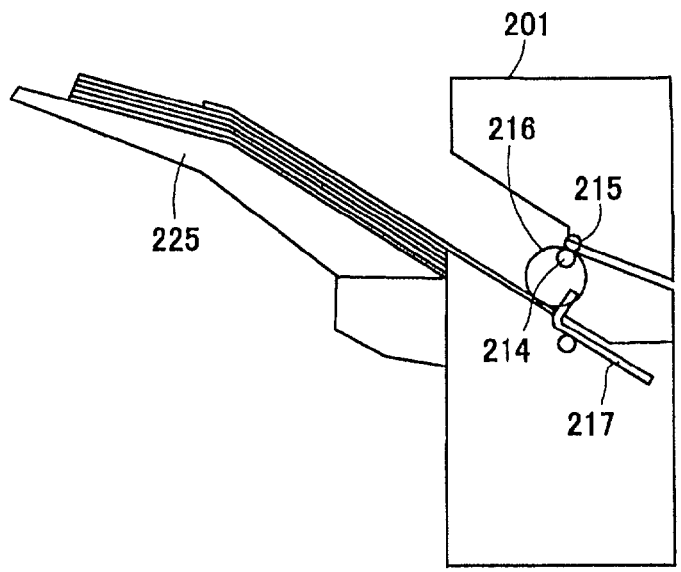
FIGS. 35(a) to 35(c) are views explaining an operation of the conventional finishing apparatus.
Figure 35B:
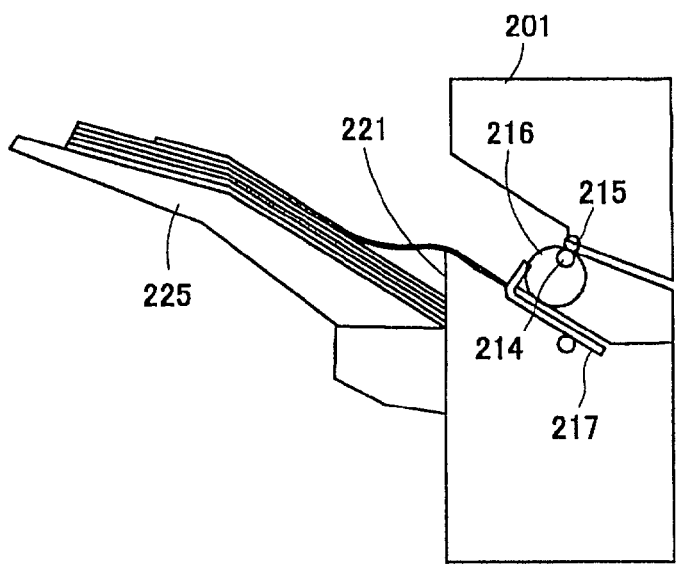
Figure 35C:
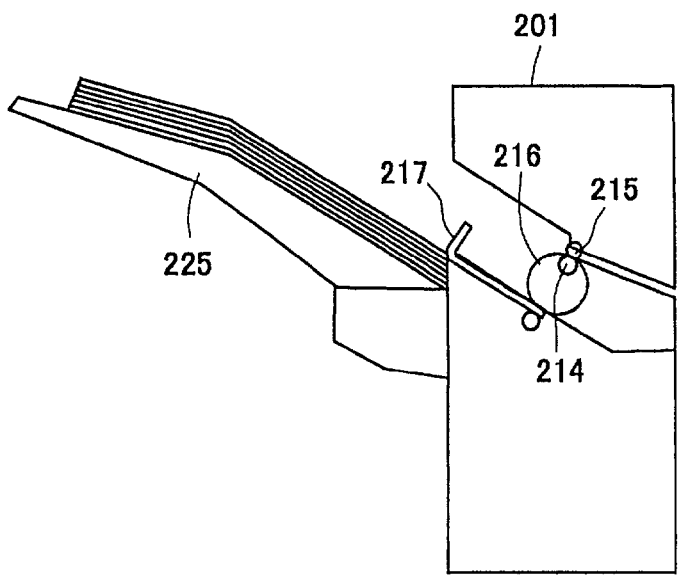

(c) Modified Example of Control (FIG. 31 to FIG. 32)

In FIG. 31 to FIG. 32, an example of control without the alignment means 60 (the pulling means) is shown. That is, the sheet is moved to the finishing means all at once without (pre-) aligning preparatorily to the preparatory (pre-) alignment position, more accurately, the sheet is moved to the width direction alignment reference position (the positioning plate 22).

The following points in FIG. 31 differ from those in the aforementioned FIG. 28. That is, in the aforementioned FIG. 28, the distance of movement (D1 and D4 in FIG. 13, and d1 and d4 in FIG. 14) to the preparatory (pre-) alignment position is calculated, and the adjusted alignment position is set according to the calculated result at step ST14 and step ST16. However, at step ST14a and step ST16a in FIG. 31, the distance of movement (D6 in FIG. 13 and d6 in FIG. 14) to the width direction alignment reference position (the positioning plate 22) is calculated, and the calculated result is set as the adjusted alignment position according.

Further, the following points in FIG. 32 differ from those in the aforementioned FIG. 29. That is, in the aforementioned FIG. 29, it sets the caterpillar pulling pulse at step ST24 and step ST25, and waits for the transport motor to stop. However, at step ST25a in FIG. 32, because the alignment means (the pulling means) 60 does not exist, just the transport motor is stopped.

<Effects of the Actions of the Embodiment>

In the conventional apparatus, after the sheet is completely discharged to the tray, either the alignment plate or the alignment bar pushes the sheet to move to the alignment reference member to be aligned. On the other hand, in the sheet finishing apparatus 1 of this embodiment, the sorting means disposed further upstream in the sheet transport direction than the belt units 61 and 61 that are the alignment means can perform the preparatory (pre) alignment for the sheet SS, thereby improving the precision and efficiency of the alignment without having to add a dedicated alignment device.

Further, because the slide joint plate 41 as the sorting means, the supporting shafts 11 and 12 and the pair of the tray discharge rollers 4 and 5 mounted on each supporting shaft, can advance and retract at the same time the pair of the tray discharge rollers 4 and 5 transports the sheet, the alignment operation to the preparatory (pre-) alignment position can be started while the sheet SS is being discharged by the pair of the tray discharge rollers 4 and 5, thereby further increasing the alignment efficiency.

Note that this invention can be configured as the sheet finishing apparatus, as well as it can also be configured as an image forming apparatus equipped with the sheet finishing apparatus.

As described above, in the sheet post-processing apparatus and image forming apparatus according to the present invention, the sheet applied the post-processing is moved by the moving means in a direction different from the discharge direction by the discharge means, for example in a traversing direction or a angled traversing direction, to discharge the sheet to the sheet storage means. Normally, the sheet has the curl in the feeding direction. However, because the sheet is moved in the direction traversing the direction of the curl, the discharging drive force is not absorbed by the sheet curl, as occurs conventionally, thereby enabling the sheet to be securely discharged to the sheet supply tray.

Furthermore, the moving means acts on the curled portion occurred on the sheet between the sheet support means and the sheet storage means, and moves the sheet in the direction differing from the discharge direction by the discharge means, for example in the traversing direction or the angled traversing direction, so that the sheet can be securely discharged to the sheet supply tray.

Furthermore, the drive means for driving the moving means is established between the sheet support means and the sheet storage means, thereby enabling a compact apparatus that effectively utilizes a space.

What is claimed is:

1. A sheet post-processing apparatus comprising:
discharge means for discharging a sheet,
sheet storage means established below the sheet discharge means for substantially supporting the sheet discharged from the discharge means,
sheet support means provided between the sheet storage means and the discharge means to form a step with respect to the sheet storage means, said sheet support means being disposed at a corner of a rear end and one side edge of the sheet storage means,
post-processing means for post-processing the sheet straddling the sheet support means and the sheet storage means,
moving means for moving the sheet postprocessed by the post-processing means in a direction different from a discharge direction by the discharge means to discharge a part of the sheet located on the sheet support means to the storage means, and
aligning means disposed at the sheet support means for aligning the sheet discharged on the sheet support means, said aligning means and said moving means moving the sheet in directions substantially opposite to each other, different from the discharge direction.

2. A sheet post-processing apparatus according to claim 1, wherein said aligning means aligns the sheet straddling the sheet support means and the sheet storage means prior to the post-processing using the post-processing means.

3. A sheet post-processing apparatus according to claim 2, wherein said moving means moves the sheet postprocessed by the post-processing means in a direction substantially perpendicular to the discharge direction by the discharge means to discharge the sheet to the storage means.

4. A sheet post-processing apparatus according to claim 2, wherein said sheet support means is a tray disposed at the corner above the sheet storage means.

5. A sheet post-processing apparatus according to claim 4, further comprising a positioning plate disposed on the tray for aligning a side portion of the sheet discharged from the discharge means, said aligning means being disposed on the tray for aligning the sheet discharged on the tray to the positioning plate.

6. A sheet post-processing apparatus according to claim 5, wherein said post processing means and said moving means are disposed on the tray.

7. A sheet post-processing apparatus according to claim 5, wherein said moving means is a lever rotationally attached to the tray for pushing the sheet on the tray to the sheet storage means, and a cam for moving the lever.

8. A sheet post-processing apparatus according to claim 1, wherein said moving means moves the sheet post-processed by the post-processing means in a direction substantially perpendicular to the discharge direction by the discharge means to discharge the sheet to the storage means.

9. A sheet post-processing apparatus according to claim 1, wherein the moving means acts on a curled portion of the sheet post-processed by the post-processing means and discharges the sheet to the storage means.

10. An image forming apparatus comprising: sheet feeding means for feeding a sheet one at a time, image forming means for forming a desired image on the sheet fed by the sheet feeding means, and the sheet post-processing apparatus according to claim 1 for post-processing the sheet with the image formed thereupon by the image forming means.

11. A sheet post-processing apparatus according to claim 1, wherein said moving means is a lever rotationally disposed at one side of the sheet support means, said lever being moved to push the sheet on the sheet support means to entirely locate the sheet on the sheet storage means.

12. A sheet post-processing apparatus according to claim 11, wherein said lever pushes the sheet on the sheet support means in a direction substantially perpendicularly to the sheet discharge direction.

13. A sheet post-processing apparatus according to claim 1, wherein said aligning means is a belt unit disposed above the sheet support means, said belt unit moving the sheet on the sheet support means to one side thereof.

14. A sheet post-processing apparatus comprising:
discharge means for discharging a sheet,
sheet storage means established below the sheet discharge means for substantially supporting the sheet discharged from the discharge means,
sheet support means provided between the sheet storage means and the discharge means to form a step with respect to the sheet storage means, said sheet support means being disposed at a corner of a rear end and one side edge of the sheet storage means,
post-processing means for post-processing the sheet straddling the sheet support means and the sheet storage means,
moving means for moving the sheet post-processed by the post-processing means in a direction different from a discharge direction by the discharge means to discharge a part of the sheet located on the sheet support means to the storage means,
aligning means disposed at the sheet support means for aligning the sheet discharged on the sheet support means, said aligning means and said moving means moving the sheet in directions opposite to each other, different from the discharge direction, and
drive means disposed between the sheet support means and the sheet storage means for driving the sheet moving means.

* * * * *